United States Patent
Slupik et al.

(10) Patent No.: US 9,864,351 B2
(45) Date of Patent: Jan. 9, 2018

(54) SYSTEM, METHOD AND APPARATUS FOR RESUPPLYING FAST MOVING CONSUMABLE GOODS ASSOCIATED WITH APPLIANCES

(71) Applicant: Silvair Sp. z o.o., Krakow OT (PL)

(72) Inventors: Szymon Slupik, Cracow (PL); Adam Gembala, Cracow (PL)

(73) Assignee: Silvair Sp. z o.o., Cracow (PL)

( * ) Notice: Subject to any disclaimer, the term of this patent is extended or adjusted under 35 U.S.C. 154(b) by 586 days.

(21) Appl. No.: 14/513,847

(22) Filed: Oct. 14, 2014

(65) Prior Publication Data

US 2015/0105880 A1    Apr. 16, 2015

Related U.S. Application Data

(60) Provisional application No. 61/890,937, filed on Oct. 15, 2013.

(51) Int. Cl.
*G06F 17/00* (2006.01)
*G05B 15/02* (2006.01)
(Continued)

(52) U.S. Cl.
CPC ......... *G05B 15/02* (2013.01); *G06Q 30/0633* (2013.01); *H04L 12/2803* (2013.01);
(Continued)

(58) Field of Classification Search
None
See application file for complete search history.

(56) References Cited

U.S. PATENT DOCUMENTS 5,305,199 A    4/1994    LoBiondo et al.
6,107,918 A    8/2000    Klein et al.
(Continued)

FOREIGN PATENT DOCUMENTS

| WO | 0073966 A1 | 12/2000 |
| WO | 03075243 A1 | 9/2003 |
| WO | 2004029727 A1 | 4/2004 |

OTHER PUBLICATIONS

"Office Action" issued in related U.S. Appl. No. 14/195,941, dated Mar. 25, 2016, Publisher: USPTO.
(Continued)

*Primary Examiner* — Adam Lee
(74) *Attorney, Agent, or Firm* — McGeary Cukor LLC; Kenneth Ottesen; Jason Paul DeMont

(57) ABSTRACT

A consumable-goods reordering system in which a system controller has access to the signals transmitted by each smart appliance relevant to the environment being monitored, such as a home. Each appliance monitors a particular physical condition that is related to the appliance's usage of a consumable good, senses changes in the condition being monitored, and reports states of the condition. Meanwhile, the system controller memorizes and maintains the states of various processing events, such as when an appliance reported a particular state of the monitored condition. By considering the information reported by the multiple smart appliances, as well as by accounting for the states corresponding to the various events, the system controller is able to continually update a representation of the state of the monitored environment. Having such context awareness enables the system controller to generate intelligently various reorder messages for transmission to the various suppliers of the consumables.

20 Claims, 8 Drawing Sheets

(51) Int. Cl.
  *H04L 12/28* (2006.01)
  *G06Q 30/06* (2012.01)
  *G08B 25/00* (2006.01)
  *G08B 21/00* (2006.01)
  *G08B 23/00* (2006.01)

(52) U.S. Cl.
  CPC ...... *H04L 12/2816* (2013.01); *H04L 12/2825* (2013.01); *H04L 12/2827* (2013.01); *G05B 2219/25011* (2013.01); *G05B 2219/2614* (2013.01); *G05B 2219/2642* (2013.01); *G08B 21/00* (2013.01); *G08B 23/00* (2013.01); *G08B 25/00* (2013.01); *H04L 2012/285* (2013.01)

(56) References Cited

U.S. PATENT DOCUMENTS

| | | | |
|---|---|---|---|
| 6,249,774 B1* | 6/2001 | Roden | G06Q 10/06315 700/106 |
| 6,366,829 B1* | 4/2002 | Wallace | G06K 17/00 700/236 |
| 6,572,318 B2* | 6/2003 | Cobene | B42C 19/02 399/24 |
| 6,772,016 B1 | 8/2004 | Orn | |
| 6,909,367 B1 | 6/2005 | Wetmore | |
| 7,120,592 B1* | 10/2006 | Lewis | G06Q 20/12 705/14.34 |
| 7,130,814 B1* | 10/2006 | Szabo | G06Q 30/0201 186/26 |
| 7,761,336 B1* | 7/2010 | Blankenship | B23K 9/1062 219/121.11 |
| 8,538,824 B1* | 9/2013 | McKay | G06Q 30/0264 705/26.1 |
| 8,583,512 B1* | 11/2013 | Gupta | G06Q 30/06 705/26.1 |
| 8,600,835 B1* | 12/2013 | Lueck | G06Q 30/0283 705/26.1 |
| 2001/0042658 A1* | 11/2001 | Allen | B60N 3/10 186/62 |
| 2002/0008883 A1* | 1/2002 | Shibata | G06Q 10/087 358/1.15 |
| 2002/0027164 A1* | 3/2002 | Mault | A61B 5/1118 235/462.46 |
| 2002/0073130 A1* | 6/2002 | Haines | G06Q 10/107 718/102 |
| 2002/0082735 A1* | 6/2002 | Wallace | G06K 17/00 700/106 |
| 2002/0143669 A1* | 10/2002 | Scheer | G06Q 10/087 705/28 |
| 2002/0152128 A1* | 10/2002 | Walch | G06Q 10/08 705/26.2 |
| 2002/0158398 A1* | 10/2002 | Cobene | B42C 19/02 270/52.18 |
| 2002/0174001 A1* | 11/2002 | Henry | G06Q 10/087 705/28 |
| 2003/0023501 A1* | 1/2003 | Ailing | G06Q 10/087 705/26.8 |
| 2003/0071726 A1* | 4/2003 | Hopper | G06K 15/00 340/540 |
| 2003/0090696 A1* | 5/2003 | Willis | G03G 15/553 358/1.14 |
| 2003/0169171 A1 | 9/2003 | Strubbe et al. | |
| 2004/0030604 A1* | 2/2004 | Young | G06Q 10/06312 705/307 |
| 2004/0103048 A1* | 5/2004 | Vitulli | G06Q 10/087 705/28 |
| 2004/0189460 A1 | 9/2004 | Heaton et al. | |
| 2006/0085298 A1* | 4/2006 | Inskeep | G06Q 10/087 705/28 |
| 2006/0277117 A1* | 12/2006 | Lewis | G06Q 20/12 705/26.2 |
| 2007/0080153 A1* | 4/2007 | Albrecht | B23K 9/10 219/130.01 |
| 2007/0136214 A1* | 6/2007 | Eskandari | B41J 2/17509 705/408 |
| 2007/0185778 A1* | 8/2007 | Weng | G06Q 30/06 705/26.41 |
| 2007/0273912 A1* | 11/2007 | Maurin | G07B 17/00508 358/1.14 |
| 2008/0042422 A1* | 2/2008 | Maluso | G09F 3/10 283/55 |
| 2008/0052201 A1* | 2/2008 | Bodin | G06Q 10/087 705/28 |
| 2008/0071626 A1* | 3/2008 | Hill | G06Q 10/00 705/22 |
| 2008/0079989 A1* | 4/2008 | Agnetta | G03G 15/55 358/1.15 |
| 2008/0103918 A1* | 5/2008 | Burnette | G06Q 30/06 705/15 |
| 2008/0232829 A1* | 9/2008 | Golding | G03G 15/553 399/27 |
| 2008/0319580 A1* | 12/2008 | Vahlberg | G06Q 10/087 700/242 |
| 2008/0319581 A1* | 12/2008 | Vahlberg | G06Q 10/087 700/242 |
| 2009/0094131 A1* | 4/2009 | Diamond | G06Q 10/08 705/26.1 |
| 2009/0119142 A1* | 5/2009 | Yenni | G06Q 10/06 705/7.15 |
| 2009/0143900 A1* | 6/2009 | Hyde | G06F 19/3462 700/231 |
| 2010/0063644 A1 | 3/2010 | Kansal et al. | |
| 2010/0082458 A1* | 4/2010 | Godlewski | G06Q 30/0635 705/28 |
| 2010/0241484 A1* | 9/2010 | Nichols | G06Q 10/06311 705/7.13 |
| 2010/0249990 A1* | 9/2010 | Tsao | G05B 19/418 700/218 |
| 2010/0271655 A1* | 10/2010 | Reitz | G06F 3/121 358/1.15 |
| 2011/0106328 A1 | 5/2011 | Zhou et al. | |
| 2012/0046988 A1* | 2/2012 | Tsongas | B41J 2/17566 705/7.25 |
| 2012/0150677 A1* | 6/2012 | Shuster | G06Q 30/0601 705/26.1 |
| 2012/0265350 A1 | 10/2012 | Ashdown | |
| 2012/0310376 A1 | 12/2012 | Krumm et al. | |
| 2013/0108285 A1* | 5/2013 | Spink | G03G 15/556 399/24 |
| 2013/0132231 A1* | 5/2013 | Teudt | G06Q 30/06 705/26.8 |
| 2013/0151012 A1 | 6/2013 | Shetty et al. | |
| 2013/0151355 A1* | 6/2013 | Abromovitz | G06Q 20/40 705/15 |
| 2014/0054361 A1* | 2/2014 | Derby | B65D 25/005 229/121 |
| 2014/0067145 A1 | 3/2014 | Shu | |
| 2014/0164278 A1* | 6/2014 | Cattoor | G06Q 10/083 705/330 |
| 2014/0183215 A1* | 7/2014 | Chen | G07F 11/38 221/251 |
| 2014/0243635 A1* | 8/2014 | Arefieg | A61B 5/157 600/365 |
| 2014/0266669 A1 | 9/2014 | Fadell et al. | |
| 2015/0100389 A1* | 4/2015 | Deroller | G06Q 10/0639 705/7.38 |

OTHER PUBLICATIONS

Authorized Officer: Athina Nickitas-Etienne, "International Preliminary Report on Patentability" dated Apr. 28, 2016, issued in related International Patent Application No. PCT/US2014/060449.
Related International Application No. PCT/US2014/060449, "International Search Report and Written Opinion", dated Dec. 23, 2014, Publisher: PCT ISA/EPO, Published in: EP.
Related International Application No. PCT/US2014/060458, "International Search Report and Written Opinion", dated Dec. 23, 2014, Publisher: PCT ISA/EPO, Published in: EP.

(56) References Cited

OTHER PUBLICATIONS

Authorized Officer : Alistair Finnie, "International Search Report and Written Opinion" dated Jun. 2, 2015, issued in related International Application No. PCT/US2014/060573.
"Office Action" dated May 5, 2016, issued in related application U.S. Appl. No. 14/195,943.
Authorized Officer: Mineko Mohri, "International Preliminary Report on Patentability" dated Apr. 28, 2016, issued in related International Patent Application No. PCT/US2014/060458.
"Final Office Action" dated Jan. 17, 2017 issued in related U.S. Appl. No. 14/195,943.

* cited by examiner

SYSTEM, METHOD AND APPARATUS FOR RESUPPLYING FAST MOVING CONSUMABLE GOODS ASSOCIATED WITH APPLIANCES

CROSS REFERENCE TO RELATED APPLICATIONS

The following case is incorporated herein by reference: U.S. Patent Application Ser. No. 61/890,937, filed Oct. 15, 2013. If there are any contradictions or inconsistencies in language between this application and the case that has been incorporated by reference that might affect the interpretation of the claims in this application, the claims in this application should be interpreted to be consistent with the language in this application.

FIELD OF THE INVENTION

The present invention relates to building automation and control in general, and, more particularly, to a system for reordering of consumable goods that are consumed within a building environment comprising appliances.

BACKGROUND OF THE INVENTION

Home automation and control refers to the use of computer and information technology to control home systems, such as lighting; heating, ventilation, and air conditioning (HVAC); audio-visual; smoke detection; security; and sunlight shading. Using specialized hardware, even household appliances such as coffeemakers can be monitored and controlled automatically. A feature of science fiction for many years, home automation has only recently become practical in some aspects, both from a technological and cost perspective. This is due to the rapid advancement of information technology.

A home automation and control system (hereinafter "home automation system") in the prior art can include i) sensor devices configured to monitor conditions such as temperature, light, motion detection, and so on, ii) actor devices to control devices such as motorized valves, switches, and so on, and iii) some control logic. The system also can include a human-machine interface device that enables someone, such as a resident of the home or an occupant of a building, to interact with the system. The interface is typically a specialized, dedicated terminal or an application ("app") running on a smartphone or tablet computer. The various sensor, actor, and interface devices communicate over dedicated wiring, or over a wired network, or wirelessly, using one or more protocols.

The sensor devices that are present in a home automation system typically sense one or more conditions such as motion, temperature, light, humidity, carbon dioxide, carbon monoxide, standing water, rain, and smoke. A home automation system having such sensor devices present is able to trigger certain events, such as turning on lights with motion detection, controlling HVAC systems, and so on.

Some household appliances, such as the coffeemaker mentioned earlier, perform a specific task, such as brewing coffee, and use a consumable good, such as a coffee cartridge. In some cases, the household appliance is able to report a status to a second device, such as to a smartphone running an app that is related to the appliance being monitored. In some cases, a person can use a surrogate device to transmit a status to the second device, on behalf of the household appliance. For example, a WiFi-enabled device with a pushbutton is available that can be affixed, via a magnet, to a water cooler or other nearby appliance. When a person wants to reorder bottled water, she presses the button on the WiFi-enabled device, causing the device to transmit a preconfigured signal over the Internet to the water supplier.

Home automation systems in the prior art are typically based on peer-to-peer network architectures that include the sensor or actor devices mentioned earlier. Sensor devices transmit information, such that the information can be acted upon. For example, a sensor detects a button being pushed, propagates this information such that a light module receives it, which turns on electrical current to a light bulb as a result. Similarly, the status-reporting device described above typically transmits a message to a predetermined recipient, which usually is an app at a smartphone or is a computer system of the business entity that provided the reporting device to their customer in the first place. In this case, if a sensor at a household device detects a low-supply condition or, alternatively, detects a button being pushed as in the example described above, the device propagates this information by using a predetermined network address for the intended recipient, wherein the network address corresponds to a server computer of the business entity associated with the device.

SUMMARY OF THE INVENTION

The present invention enables the efficient reordering of various goods consumed within a home environment, based in part on signals received from one or more smart appliances used in the home environment. The system, apparatus, and method for reordering that are disclosed herein are made possible by introducing a centralized, system controller, in contrast to a peer-to-peer system in the prior art, wherein the controller is capable of interacting with multiple smart appliances and supplier systems. The reordering features are further enhanced by providing the system controller with context awareness of the operating states of the appliances and of the home environment itself.

In the disclosed automation system, the system controller has access to the signals transmitted by each smart appliance relevant to the environment being controlled and monitored. Each smart appliance monitors a particular physical condition that is related the appliance's usage of one or more consumable goods, senses changes in the condition being monitored, and reports states of the condition, which information is made available to the system controller. Meanwhile, the system controller memorizes and maintains the states of various processing events, such as when a smart appliance reported a particular state of the monitored condition. By considering the information reported by the various and multiple smart appliances, as well as by accounting for the memorized states corresponding to the various events, the system controller is able to generate and continually update a representation of the state of the controlled home environment, thereby becoming and remaining context aware. Having such context awareness enables the design and implementation of sophisticated reasoning logic and conditional logic, which is used by the system controller to generate reorder messages for transmission to one or more supplier systems.

The system controller of the illustrative embodiment is in communication with and monitors various types of appliances, including kitchen appliances that use and dispensers that at least contain various consumables, such as but not limited to fast-moving consumer goods ("FMCG"). Non-limiting examples of FMCG categories are food, toiletries, soft drinks, paper goods, and so on. More specific, non-limiting examples of monitored appliances and their respective FMCGs include the following:

i. a toothbrush that uses a toothbrush tip,
ii. a soap dispenser that uses a soap cartridge,
iii. a safety razor that uses a blade refill,
iv. an air freshener that uses a fragrance refill,
v. a spray dispenser (e.g., cleaning device, etc.) that uses a spray refill,
vi. a beverage dispenser with a beverage cartridge,
vii. a toilet tissue holder with tissue roll,
viii. a flashlight with battery, and
ix. a water pitcher with filter.

Based on the state information that it maintains, the system controller can order consumables online automatically, effectively providing an automated, "0-click" shopping experience. In some embodiments of the present invention, the system controller can also predict when the consumables will be exhausted, in part based on various inference and anticipation techniques disclosed herein. In some embodiments of the present invention, the controller can also schedule the reorders and determine other delivery parameters, select one or more supplier systems to which to send the reorders, and aggregate multiple requests into fewer reorder messages actually transmitted, according to the memorized state information and other contextual information such as schedules that are reflected by residents' calendars, the number of people living in the home, and so on.

The system controller disclosed herein monitors the various types of appliances and smart devices in general, in accordance with a low-power radio technology such as Bluetooth Low Energy (BLE), for example and without limitation. By using wireless components based on such protocols, which have the advantage of enabling low cost in addition to supporting low-power operation, the monitoring and reordering system of the illustrative embodiment can be applied not to only larger appliances such as refrigerators, but to smaller appliances and devices such as electric kettles and dispensers equipped with low-power radio modules. The radio module of the dispenser, for example, can be programmed to report that a portion of a consumable has been dispensed, or even to count the number of portions dispensed, and then to report this information to the system controller for the purpose of automatically reordering the consumable at the appropriate time. By using a lower-cost communications protocol such as, but not limited to, BLE in contrast to a higher-cost protocol such as one that is cellular telephony-based (e.g., GSM, etc.) or even LAN-based (e.g., WiFi, etc.), the system of the illustrative embodiment enables a reduction in the cost of each smart device, thereby providing a practical way of introducing larger numbers of such appliances into a household.

In addition to enabling reduced costs, the system of the illustrative embodiment can provide other benefits. Benefits to suppliers and other distributors include the aggregation of supplies, order prediction, optimized logistics, subscription-based business models, and upsell opportunities. Meanwhile, the system controller can provide usage statistics and service notifications to the household or to suppliers, or both, in order to improve the overall user experience, for example.

In some embodiments of the present invention, an independent, physical reorder button that is equipped with a low-power radio module can be used, in which the radio module is programmed in accordance with at least some of the techniques disclosed herein. Each such "smart" button has a unique identifier that can be mapped to a reorder template; depending on the usage scenario, the association of identifier to template can be performed by a home resident or preconfigured by a supplier. The radio module of the smart button sends a notification of a button push to the system controller, which in turn contacts the supplier via the Internet and executes the reorder transaction. For example, before fully automated dispensers and other smart appliances become widely available, each reorder pushbutton can be associated with and situated nearby a consumable-using device, or group of devices. Additionally, a system comprising smart buttons in communication with a local, system controller enables, among other features, the aggregation of reorder requests originating from smart buttons, with other requests related to other appliances.

In accordance with an illustrative embodiment, the disclosed automation system is an automation system in a home. As those who are skilled in the art will appreciate after reading this specification, however, the disclosed automation system can be applied to any type of building, including the environment surrounding the building, or to any environment in which automated control can be applied.

An illustrative method comprises: receiving, by a first computer system, a first signal from a first appliance, wherein the first signal is indicative of a use of a particular consumable good; updating in a memory, by the first computer system, a current memorized state of at least one processing event, the current memorized state being based on i) the receiving of the first signal from the first appliance and ii) a previous memorized state, such that the current memorized state correlates with an estimate of the amount currently having been consumed of the consumable good; generating, by the first computer system, a first indication that the consumable good is to be reordered, based on the current memorized state in relation to a first predetermined criterion; and transmitting, by the first computer system, a reorder message to a second computer system, wherein the transmitted reorder message is based on the generated first indication, and wherein the second computer system is for processing messages representative of reorders of the consumable good.

An illustrative building automation controller comprises:
a first network adapter configured to receive a first signal from a first appliance, wherein the first signal is indicative of a use of a particular consumable good;
a processor configured to:
a) update, in a memory, a current memorized state of at least one processing event, the current memorized state being based on i) the receiving of the first signal from the first appliance and ii) a previous memorized state, such that the current memorized state correlates with an estimate of the amount currently having been consumed of the consumable good, and
b) generate a first indication that the consumable good is to be reordered, based on the current memorized state in relation to a first predetermined criterion; and
a second network adapter configured to transmit a reorder message to a computer system, wherein the transmitted reorder message is based on the generated first indication, and wherein the computer system is for processing messages representative of reorders of the consumable good.

An illustrative building automation system comprises:
a first appliance comprising a first network adapter that is configured to transmit a first signal, wherein the signal is indicative of a use of a particular consumable good; and a controller comprising:

1) a second network adapter that is configured to receive the first signal from the first appliance,
2) a processor that is configured to:
   a) update, in a memory, a current memorized state of at least one processing event, the current memorized state being based on i) the receiving of the first signal from the first appliance and ii) a previous memorized state, such that the current memorized state correlates with an estimate of the amount currently having been consumed of the consumable good, and
   b) generate a first indication that the consumable good is to be reordered, based on the current memorized state in relation to a first predetermined criterion, and
3) a third network adapter that is configured to transmit a reorder message to a computer system, wherein the transmitted reorder message is based on the generated first indication, and wherein the computer system is for processing messages representative of reorders of the consumable good.

DETAILED DESCRIPTION

For the purposes of the present specification, the following terms and their inflected forms are defined as follows:

i. An "appliance" is defined as a device or piece of equipment designed to perform a specific task such as, but without being limited to, a domestic task. A "smart appliance" or "connected appliance" is an appliance that is able to telecommunicate with at least one other device.

ii. A "building" is defined as a structure with a roof and walls such as, but without being limited to, a house, a school, a store, a factory, an apartment complex, an office complex, or a corporate office. A building can comprise one or more dwellings such as, but without being limited to, a house, an apartment, or another place of residence.

iii. A "business entity" is defined as a commercial, corporate, and/or other institution that is formed and administered according to commercial law in order to engage in business activities, for the sale of a product (e.g., the product unit disclosed herein, etc.) or a service. For example and without limitation, a business entity can be a corporation, partnership, limited liability company, limited liability partnership, sole proprietorship, sole trader, or cooperative.

iv. A "consumable good" or "consumable" is defined as a product that is intended to be used up and replaced recurrently.

v. A "message" is defined as a discrete unit of communication intended by the source for consumption by some recipient or group of recipients, and is conveyed by one or more electrical impulses or radio waves.

vi. A "movement" is defined a change in physical location or position.

vii. A "reorder" is defined as a repeated order for the same good, consumable or otherwise.

viii. A "signal" is defined as an electrical impulse or radio wave transmitted or received.

Other terms may also be defined elsewhere herein.

To facilitate explanation and understanding of the present invention, the following description sets forth several details. However, it will be clear to those having ordinary skill in the art, after reading the present disclosure, that the present invention may be practiced without these specific details, or with an equivalent solution or configuration. Furthermore, some structures, devices, and operations that are well known in the art are depicted in block diagram form in the accompanying figures in order to keep salient aspects of the present invention from being unnecessarily obscured.

Figure 1:
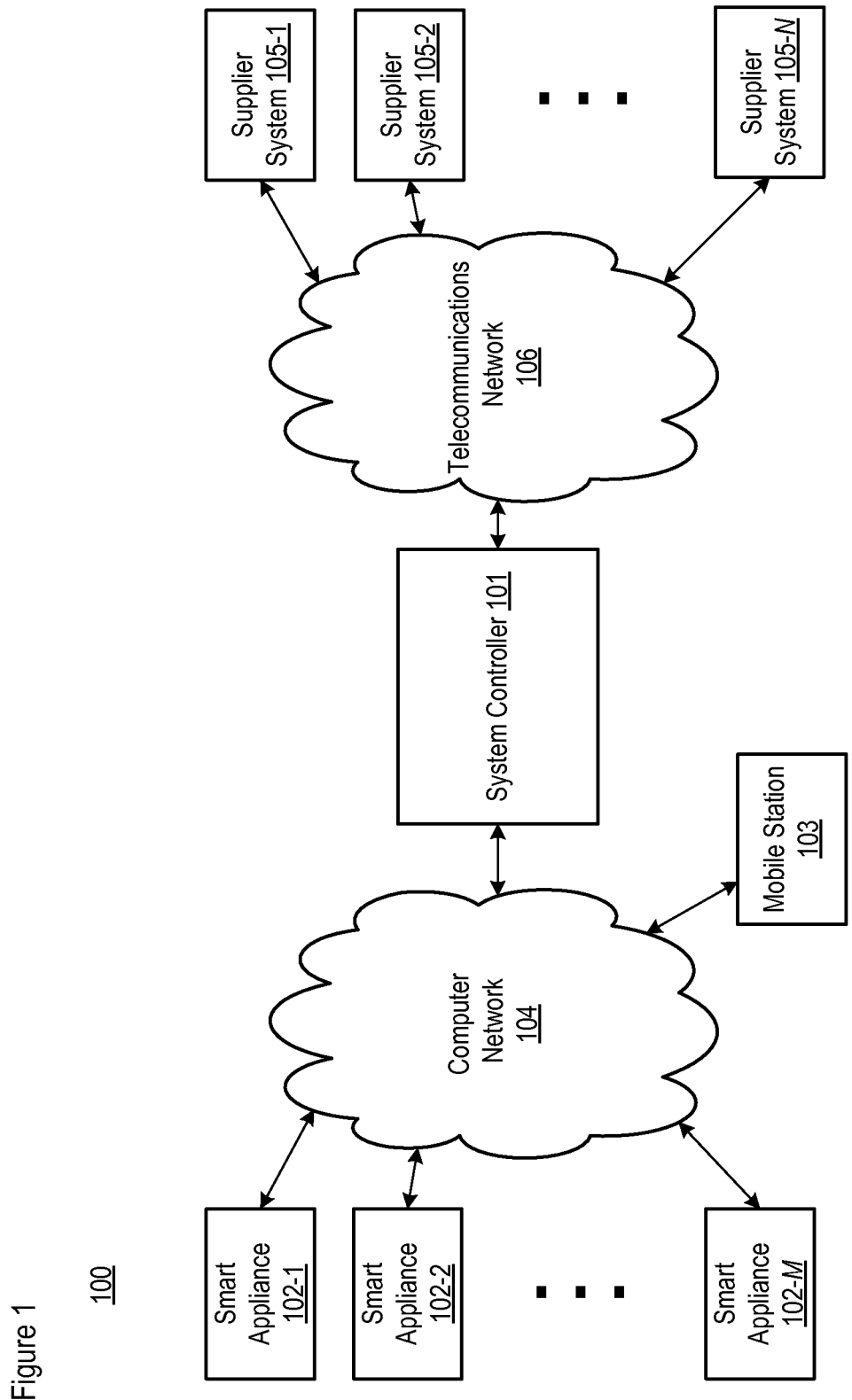
FIG. 1 depicts telecommunications system 100 according to an illustrative embodiment of the present invention.

FIG. 1 depicts telecommunications system 100, in accordance with an illustrative embodiment of the present invention. System 100 comprises: system controller 101; smart appliances 102-1 through 102-M, wherein M is a positive integer; mobile station 103; computer network 104; supplier systems 105-1 through 105-N, wherein N is a positive integer; and telecommunications network 106. The aforementioned elements are interconnected as shown.

In accordance with an illustrative embodiment of the present invention, telecommunications system 100 comprises an automation system in the home, wherein the automation system portion of system 100 comprises one or more of system controller 101, smart appliances 102-1 through 102-M, mobile station 103, and computer network 104. As those who are skilled in the art will appreciate after reading this specification, however, telecommunications system 100 can be applied to any type of building, including the environment surrounding the building, or to any environment in which automated control can be applied.

System controller 101 is an apparatus that comprises memory, processing components, and communication components. Controller 101 is illustratively a computer system such as a server computer, for example and without limitation. Controller 101 executes and coordinates actions to be taken, including the reordering of one or more consumables, based on i) the signals received from one or more smart appliances 102-1 through 102-M and ii) one or more memorized states of at least one processing event. In particular, controller 101 receives information about the states of smart appliances 102-1 through 102-M, maintains in memory the states of various processing events (e.g., predetermined sequences of various signal values, the time since a last instance of a predetermined signal value was received, other events that reflect changes in states reported by the sensor devices, etc.). System controller 101 is described in more detail below and in FIG. 2.

In accordance with the illustrative embodiment, system controller 101 telecommunicates wirelessly with the other depicted devices (i.e., sensor devices and actor devices). It will be clear to those skilled in the art, however, after reading the present disclosure, how to make use and use various embodiments of the present invention in which controller 101 telecommunicates via physical media (e.g., cable, wire, etc.) to one or more of the other devices, either in addition to or instead of wirelessly.

In some alternative embodiments of the present invention, system controller 101 might not be a physically distinct device per se, instead its functionality might be embodied in one or more of the smart appliances and/or supplier systems, or cloud-based outside of the building being controlled, or of some combination thereof.

Smart appliance 102-$m$, wherein m can have a value of 1 through M, is an apparatus that comprises memory, processing components, and communication components. For example and without limitation, appliance 102-$m$ can be a sound system, a kitchen appliance, another home appliance, an electrical plug, a thermostat, a coffee maker, or a kettle.

The smart appliance can comprise a component designed to perform a specific task or tasks and a component configured to accept one or more consumable goods that are used by the appliance in performing the specific tasks. In particular, such consumable goods can be fast-moving consumer goods (FMCG), for example and without limitation. The following are non-limiting examples of such appliances and their respective consumables:
  i. a toothbrush that uses a toothbrush tip,
  ii. a soap dispenser that uses a soap cartridge,
  iii. a safety razor that uses a blade refill,
  iv. an air freshener that uses a fragrance refill,
  v. a spray dispenser (e.g., cleaning device, etc.) that uses a spray refill,
  vi. a beverage dispenser with a beverage cartridge,
  vii. a toilet tissue holder with tissue roll,
  viii. a flashlight with battery, and
  ix. a water pitcher with filter.

However, as those who are skilled in the art will appreciate after reading this specification, the smart appliance can use another type of consumable good or be another type of apparatus that uses a consumable good. Smart appliance 102-$m$ is described in detail below and in FIG. 3.

Mobile station 103 is a wireless telecommunications terminal that is configured to transmit and/or receive communications wirelessly. It is an apparatus that comprises memory, processing components, and communication components. Mobile station 103 comprises the hardware and software necessary to be compliant with the protocol standards used in the wireless network or networks (e.g., network 104, network 106, etc.) in which it operates and to perform the processes described below and in the accompanying figures. For example and without limitation, mobile station 103 is capable of:
  i. receiving an incoming (i.e., "mobile-terminated") telephone call or other communication (e.g., application-specific data, SMS text, email, media stream, etc.),
  ii. transmitting an outgoing (i.e., "mobile-originated") telephone call or other communication (e.g., application-specific data, SMS text, email, media stream, etc.),
  iii. controlling and monitoring smart appliance 102-$m$, and/or
  iv. receiving, transmitting, or otherwise processing one or more signals in support of one or more of capabilities i through iii.

Furthermore, mobile station 103 is illustratively a smartphone with at least packet data capability provided and supported by the network in which it operates and that is configured to execute a software application (e.g., an "app") for configuring and/or controlling one or more of smart appliances 102-1 through 102-M. In some alternative embodiments of the present invention, mobile station 103 can be referred to by a variety of alternative names such as, while not being limited to, a wireless transmit/receive unit (WTRU), a user equipment (UE), a wireless terminal, a cell phone, or a fixed or mobile subscriber unit. For that matter, mobile station 160 can be any other type of device that is capable of operating in a wireless network environment, mobility-oriented or otherwise, and of interacting with one or more of the smart appliances and/or system controller.

Computer network 104 comprises a home area network (HAN) and enables communication between system controller 101, smart appliances 102-1 through 102-M, and mobile station 103. In accordance with an illustrative embodiment, the HAN of network 104 is based on the Bluetooth Low Energy (BLE) wireless network technology. However, as those who are skilled in the art will appreciate after reading this specification, computer network 104 can be based on one or more different types of wireless network technology standards, in addition to or instead of BLE, such as Z-Wave, ZigBee, Wi-Fi, Bluetooth Classic, or Thread, for example and without limitation. Furthermore, as those who are skilled in the art will appreciate after reading this specification, at least some of elements 101, 102, and 103 in some embodiments can be connected directly and non-wirelessly to each other, at least for some purposes and/or for some portion of time, such as through Universal Serial Bus (USB), FireWire™, or Thunderbolt™, for example and without limitation.

Supplier system 105-$n$, wherein n can have a value of 1 through N, is an apparatus that comprises memory, processing components, and communication components. The supplier system comprises one or more computer systems having non-transitory memory, processing components, and communication components, including one or more server computers, as are known in the art. Supplier system 105-$n$ processes one or more orders received from system controller 101 of one or more consumables. In some embodiments, some or all of supplier systems 105-1 through 105-N handle orders of goods produced or sold by the same business entity, while in some other embodiments some or all of supplier systems 105-1 through 105-N handle orders of goods produced or sold by different business entities.

Telecommunications network 106 comprises a collection of links and nodes that enable telecommunication between devices, in well-known fashion. Telecommunications network 106 provides at least some of the elements of system 100 with connectivity to one other. In some embodiments of the present invention, telecommunications network 106 is the Internet; in some other embodiments of the present invention, network 106 is the Public Switched Telephone Network (PSTN); in still some other embodiments of the present invention, network 106 is a private data network. It will be clear to those with ordinary skill in the art, after reading this disclosure, that in some embodiments of the present invention network 106 can comprise one or more of the above-mentioned networks and/or other telecommunications networks, without limitation. Furthermore, it will be clear to those will ordinary skill in the art, after reading this disclosure, that telecommunications network 106 can comprise elements that are capable of wired and/or wireless communication, without limitation.

Figure 2:
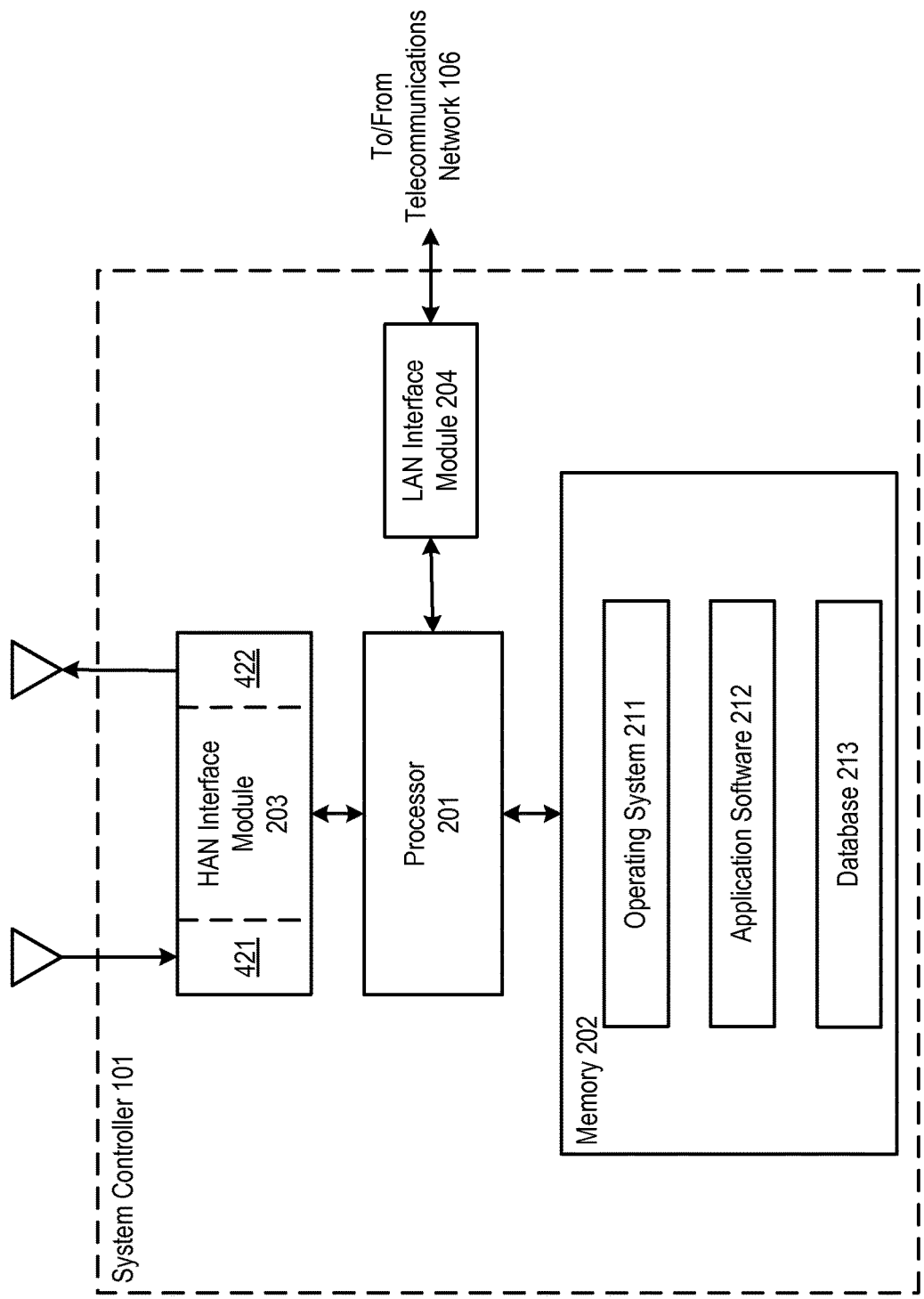
FIG. 2 depicts the salient components of system controller 101 according to an illustrative embodiment of the present invention.

FIG. 2 depicts the salient components of system controller 101 according to an illustrative embodiment of the present invention. According to the illustrative embodiment, system controller 101 is based on a data-processing apparatus whose hardware platform comprises: processor 201, memory 202, home area network (HAN) interface module 203, and local area network (LAN) interface module 204, interconnected as shown.

Processor 201 is a processing device, such as a microprocessor that is well known in the art. Processor 201 is configured such that, when operating in conjunction with the other components of system controller 101, processor 201 executes software, processes data, and telecommunicates according to the operations described herein. It will be clear to those skilled in the art, after reading this specification, how to make and use processor 201.

Processor 201 is configured to handle both:
i. combinatorial logic, whose output is a function of only the present input (e.g., signal values from smart appliances 102-1 through 102-M, etc.), and
ii. sequential logic, whose output depends also on the past history of the inputs.

In handling sequential logic, processor 201 memorizes (e.g., stores into memory 202, etc.) certain events, states, results, and so on, for future use. In doing so, processor 201 maintains, as well as updates and uses, one or more memorized states of processing events, including the points in time when they occurred. In the sequential logic performed by processor 201, the internal, memorized state information may be processed and changed. For example, a motion sensor device has been tripped, resulting in controller 101 turning on the lights in the kitchen for five minutes. In the example, if processor 201 executes a synchronous logic that is clocked at 50 Hz, then five minutes equates to 50×60×5 clock ticks, or 15000 ticks. In this case, a counter is set up at 15000, and at every tick cycle the counter is decremented by 1. When the counter reaches zero, controller 101 turn the lights off. Then, if the motion sensor device is tripped again during the countdown time (e.g., a person is still in the kitchen and moves), the counter is reset to 15000 and continues to be decremented at every clock cycle.

Because processor 201 handles both kinds of logic, the decision logic of the illustrative embodiment is based not only on real-time input information from sensors (i.e., related to combinatorial logic) but also on some memorized state of the logic (i.e., related to sequential logic). The memorized state comprises information on processing events that occurred in the past and, at least for some events, the times at which they occurred.

The scenario of a double-click, triple-click, or long-click sensor detection is also handled by system controller 101. A pushbutton sensor device generates and reports only the two basic states of "pressed" and "released." It is up to the sequential logic of processor 201 to record these received states and their times of occurrences as processing events, and decide whether a particular sequence qualifies as a double click. For example, a double-click sequence can be predetermined as comprising a press-release-press-release cycle occurring within two seconds. In order to determine whether a double click has occurred, processor 201 needs not only to receive the current signal value (i.e., signifying "pressed"), but must also consider the memorized state of whether there have been any past signal values (i.e., signifying "presses" or "releases") received within the past two seconds, or whatever the predetermined time interval is.

The foregoing example applies to other combinations of signal values and memorized states of processing events, as those who are skilled in the art will appreciate after reading this specification. As another example of its sequential logic, processor 201 tracks which of two motion-sensor detectors in a hallway has been tripped most recently, in order to infer a direction of movement through the hallway.

Memory 202 is non-transitory and non-volatile computer storage memory technology that is well known in the art (e.g., flash memory, etc.). Memory 202 is configured to store operating system 211, application software 212, and database 213. The operating system is a collection of software that manages, in well-known fashion, system controller 101's hardware resources and provides common services for computer programs, such as those that constitute the application software. The application software that is executed by processor 201 enables system controller 101 to perform the functions disclosed herein. Database 213 comprises information about each smart appliance and their relationships with one another other, information for providing context, values of one or more building states, values of one or more activities occurring at a building, and so on.

It will be clear to those having ordinary skill in the art how to make and use alternative embodiments that comprise more than one memory 202; or comprise subdivided segments of memory 202; or comprise a plurality of memory technologies that collectively store the operating system, application software, and database.

HAN interface module 203 comprises a network adapter that is configured to enable system controller 101 to transmit information to and receive information from smart appliances 102-1 through 102-M and mobile station 103 via Bluetooth Low Energy (BLE) enabled via radio receiver part 221 and radio transmitter part 222, in accordance with an illustrative embodiment of the present invention. In some other embodiments of the present invention, HAN interface module 203 can communicate via one or more different types of wireless network technology standards, in addition to or instead of BLE, such as Z-Wave, ZigBee, Wi-Fi, Bluetooth Classic, or Thread, for example and without limitation. In a multiple protocol configuration, a first network adapter can support a first standard (e.g., BLE, etc.), a second network adapter can support a second standard (e.g., WiFi, etc.), and so on, for example and without limitation. In any event, it will be clear to those skilled in the art, after reading this specification, how to make and use HAN interface module 203.

LAN interface module 204 comprises a network adapter that is configured to enable system controller 101 to transmit information to and receive information from telecommunications network 106 via a local area network (e.g., WiFi-based, etc.). In some alternative embodiments of the present invention, controller 101 communicates with mobile station 103 via LAN interface module 204. In some other alternative embodiments, controller 101 transmits information to and receives information from telecommunications network 106 via a different interface (e.g., Ethernet-based, etc.). It will be clear to those skilled in the art, after reading this specification, how to make and use LAN interface module 204.

In accordance with an illustrative embodiment, system controller 101 uses HAN interface module 203 and LAN interface module 204 in order to telecommunicate wirelessly with external devices. It will be clear to those skilled in the art, however, after reading the present disclosure, how to make use and use various embodiments of the present invention in which system controller 101 communicates via a wired protocol (e.g., X10, KNX, etc.) over physical media (e.g., cable, wire, etc.) with one or more external devices, either in addition to or instead of the wireless capability provided by module 203 and/or module 204. It will be also clear to those skilled in the art, after reading the present disclosure, how to make use and use various embodiments in which other types of networks are supported (e.g., personal area network, etc.) and a different number of networks is supported (e.g., one, more than two, etc.).

It will be clear to those skilled in the art, after reading the present specification, that in some alternative embodiments the hardware platform of system controller 101 can be embodied as a multi-processor platform, as a sub-component of a larger computing platform, as a virtual computing element, or in some other computing environment—all within the scope of the present invention.

Figure 3:
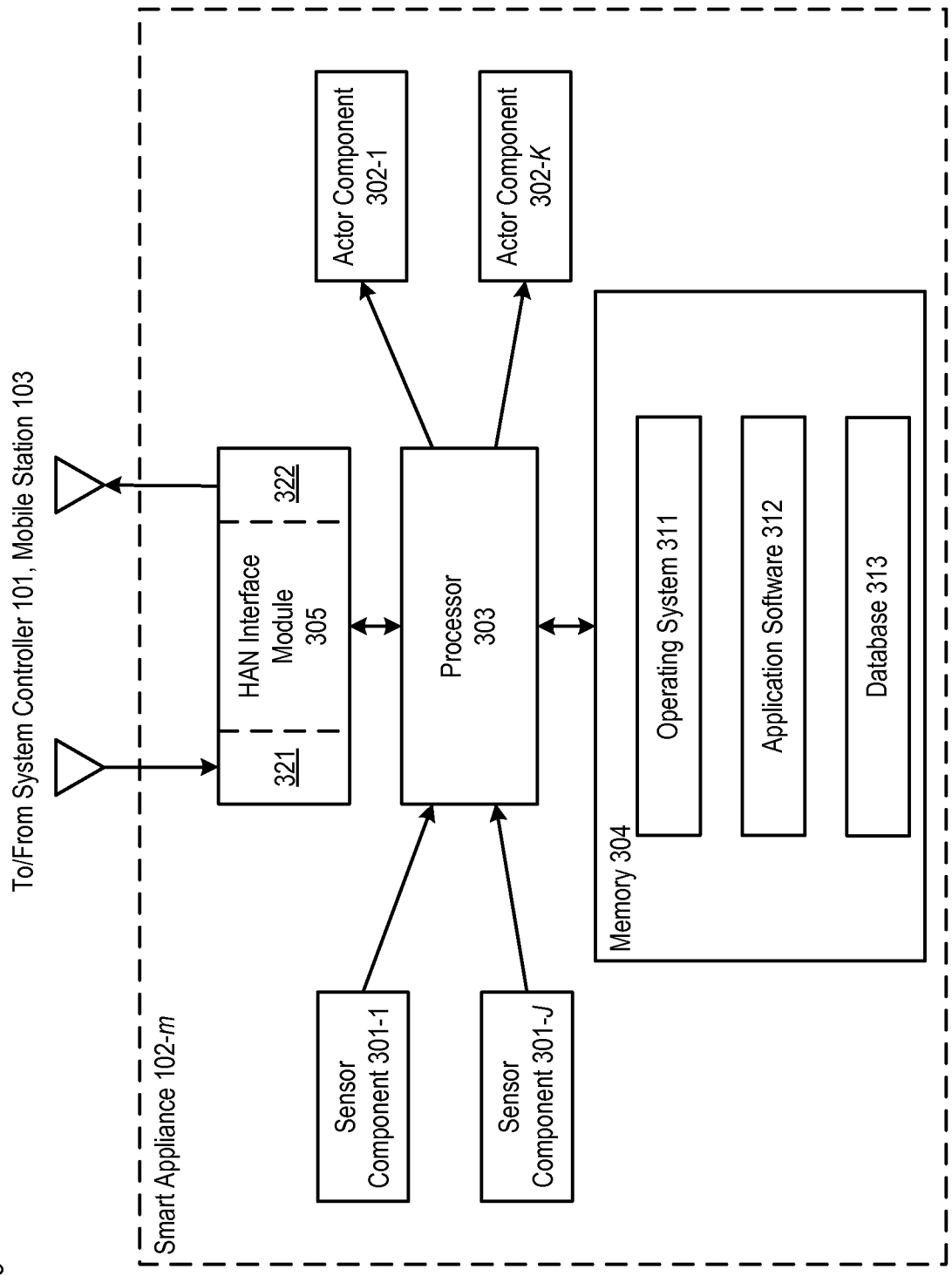
FIG. 3 depicts the salient components of smart appliance 102-$m$ according to an illustrative embodiment of the present invention.

FIG. 3 depicts the salient components of smart appliance 102-*m* according to an illustrative embodiment of the present invention. According to the illustrative embodiment, smart appliance 102-*m* is based on a data-processing apparatus whose hardware platform comprises the following electronic components: sensor components 301-1 through 301-J, wherein J is a positive integer; actor components 302-1 through 302-K, wherein K is a positive integer; processor 303, memory 304, and home area network (HAN) interface module 305, interconnected as shown. Alternatively, in some embodiments there are no sensor components present, while in some embodiments there are no actor components present. Furthermore, in some embodiments of the present invention, one or more of the elements described below can be physically integrated with each other. For example and without limitation, in some embodiments, module 304 might provide some or all of the functionalities of processor 301 and/or memory 302.

Sensor component 301-*j*, wherein j has a value between 1 and J, inclusive, is an apparatus that comprises memory, processing components, and communication components, and is configured to transmit signals providing sensor-related information, as described in detail below. In accordance with an illustrative embodiment, each sensor component 301-*j* comprises a sensor, wherein the sensor gathers information about the environment that is accessible by the sensor.

Each sensor is configured to monitor a particular physical condition in well-known fashion. A sensor senses a change in the condition being monitored and is configured to report a state of the condition by providing input signals to processor 303, wherein the values of the input signals are representative of the states being reported. A given sensor component 301-*j* can report discrete input signal values and/or a continuum of states and can report states at particular times and/or continuously. For example and without limitation, sensor component 301-*j* can comprise one or more of the following sensor with respective functions:

i. a motion detection sensor (e.g., a Passive InfraRed [PIR] element, etc.) to detect and report the motion and/or presence of humans. For example, the reported state might be "motion detected" or "motion not detected".

ii. a temperature sensor to detect and report ambient temperature. For example, the reported state might be a temperature value.

iii. a light (luminescence) sensor to detect and report light level (e.g., ambient level, etc.). For example, the reported state might be a light-level value.

iv. a touch sensor to wake up and/or trigger other sensors, particularly those with a higher power draw (e.g., accelerometer, gyroscope, etc.). This sensor can report a touch event to trigger various actions when touched. This sensor can also be used as a protection against theft of a sensor component; for example, the system may sound an alarm when sensor component 301-*j* is touched or moved. For example, the reported state might be "contact detected" or "contact not detected".

v. an accelerometer (e.g., single-axis, multi-axis, etc.) sensor to detect and report position/orientation (e.g., incline, etc.) and other motion-related events (e.g., taps, bumps, etc.). For example, the reported state might be an orientational value and/or a positional value.

vi. a gyroscope (e.g., single-axis, multi-axis, etc.) to detect and report motion (e.g., shifts, turns, etc.). For example, the reported state might be a translational motion value and/or a rotational motion value.

vii. an air humidity sensor to detect and report humidity level, for the purpose of controlling A/C, fans, and so on. For example, the reported state might be a humidity value.

viii. a carbon dioxide sensor to detect and report carbon dioxide level, for the purpose of controlling A/C, ventilation, and so on. For example, the reported state might be a carbon dioxide level value.

ix. a carbon monoxide sensor to detect and report carbon monoxide level, for the purpose of providing a security/safety alarm function. For example, the reported state might be a carbon monoxide level value.

x. a (natural) gas sensor to detect and report gas, for the purpose of providing a security/safety alarm function. For example, the reported state might be a gas level value.

xi. a flood (water) sensor to detect and report the presence of water, implemented with exposed contact electrodes, for example. For example, the reported state might be "water detected" or "water not detected".

xii. a rain sensor to detect and report whether it is raining outside. For example, the report state might be "raining" or "not raining".

xiii. a radio beacon receiver. In some embodiments of the present invention, component 301-*j* can be moved around; accordingly, component 301-*j* is configured to be able to determine and report its location (e.g., relative location, absolute location, etc.) via receiving one or more radiolocation beacons. In some embodiments, the component can detect the proximity of other radio location beacon sources such as smart buttons, key fobs, mobile stations emitting beacon signals, and so on.

xiv. a real-time clock that can be used in conjunction with geolocation information to compute the position of the Sun, making component 301-*j* aware of the outside light level (e.g., day versus night, etc.), which the component can report on.

xv. an electronic compass. For example, the reported state might be a static "heading" of the sensor component.

xvi. a sensor that is worn or carried by a person (e.g., a Jawbone Up24™ bracelet, etc.), which detects and reports a condition of the person or of the person's immediate environment. An advantage of using such a sensor associated with a person is that can provide a more direct indication of a human-related activity occurring within a building than other sensors associated with the building. Moreover, a sensor associated with a particular person is able to monitor the pace of the particular individual.

xvii. a sensor configured to sense a predetermined movement (e.g., translational, rotational, etc.).

xviii. a virtual "sensor" such as, but not limited to, a web-based service that monitors and reports on one or more environmental conditions, including reports comprising predictions of the future states of one or more of the conditions being monitored. For example, a temperature "sensor" can be a weather-forecasting web service that provides a forecast of a future temperature, future air quality, future cloud cover, future precipitation, and so on.

In particular, a sensor can be configured to sense a predetermined movement at the appliance, wherein the signal produced correlates with the movement having been sensed by the sensor. In some embodiments of the present invention, the movement correlates with a use of a consumable good by the appliance. The following are non-limiting examples of such uses that are correlatable to one or more movements and their respective consumables that are used, either directly or indirectly:

i. a brushing with a toothbrush tip,
ii. a dispensing of soap from a soap cartridge,
iii. a use of a safety razor's blade refill,
iv. an emission of an air freshener's fragrance refill,
v. a dispensing (e.g., a pump movement, etc.) of a spray dispenser's spray refill,
vi. a dispensing of a beverage from a beverage cartridge,
vii. a dispensing of a toilet tissue holder's tissue roll,
viii. a use of a flashlight's battery, and
ix. a pouring of liquid (e.g., water, etc.) from a pitcher having a filter.

In some other embodiments of the present invention, an appliance or individual sensor component that is part of an appliance can instead be a physical button that a consumer or other user can press. In this case, the signal produced correlates with the movement of the button being pressed. For example and without limitation, the button might be pressed by the user in order to indicate that a corresponding consumable good has been used and needs to be reordered.

As those who are skilled in the art will appreciate, after reading this disclosure, sensor component 301-$j$ can provide a different function or functions than those described above. Furthermore, smart appliance 102-$m$ can comprise any combination of and any number of sensor components and sensor functions, possibly including none, some, or all of those listed above.

Actor component 302-$k$, wherein k is equal to 1 through K, inclusive, is an apparatus that comprises memory, processing components, and communication components, and is capable of doing something in the course of being affected by signals originating externally to the actor component, possibly from mobile station 103, or possibly from one or more sensor components (i.e., in the smart appliance or a different one) and processed by processor 303. In accordance with an illustrative embodiment of the present invention, each actor component 302-$k$ takes decisions that are based on signals from one or more sources and performs appropriate actions upon the actor's environment. Each actor component acts upon its environment in well-known fashion. In some embodiments, an actor component is or comprises an actuator, as is known in the art.

Actor component 302-$k$ is configured to receive, transmit, process, and/or relay signals conveying data, as well as being configured to affect a condition, physical or otherwise, in its environment. For example and without limitation, the condition being affected can be:

i. lighting, which can be adjusted (e.g., turning on or off, changing color or mood, displaying a picture or pattern, etc.).
ii. sound, which can be adjusted (e.g., increasing or decreasing volume, changing playlist or mood, turning on/off, selecting signal source, etc.).
iii. room climate, which can be controlled (e.g., increasing or decreasing temperature, humidity, air fragrance, etc.).
iv. temperature of a local object or substance (e.g., cooking food, boiling liquid, etc.).
v. an alert, which can be generated (e.g., of an email, of an SMS message, etc.).
vi. monitoring by a camera, which can be panned or tilted.
vii. home entertainment/home cinema settings (e.g., selecting one or more of signal source, streaming application, multimedia to play, audio language, subtitles, chapter, play/pause/stop, rewind/fast forward, etc.).
viii. connected/smart TV features (e.g., selecting application to be launched, navigating through on-screen menus, etc.).
ix. virtual keyboard—navigation on virtual keyboard displayed by other device (e.g., TV, set-top box, etc.).
x. control of shades/window coverings.
xi. access control (e.g., unlocking/locking doors, opening/shutting doors, authorizing access to selected rooms or zones, etc.).

As those who are skilled in the art will appreciate, after reading this disclosure, actor component 302-$k$ can provide a different function than those described above. Furthermore, smart appliance 102-$m$ can comprise any combination of and any number of actor components, possibly including none, some, or all of those corresponding to the affected conditions listed above.

As those who are skilled in the art will appreciate, after reading this disclosure, smart appliance 102-$m$ comprising one or more actor functions can be in a variety of forms. For example and without limitation, such forms include a light bulb as part of a lighting system, a media player as part of an audio/video system, a heater as part of an environment control system, an outgoing-email server as part of a messaging system, an actor in a water sprinkler system, a robot or robotic arm, a pan/tilt camera, a switch, a motor, a servo mechanism, a kettle for boiling liquids, and so on. Each appliance can be further equipped with one or more sensors that sense relevant conditions (e.g., the temperature of the liquid in the kettle, etc.).

Processor 303 is a processing device, such as a microprocessor that is well known in the art. Processor 303 is configured such that, when operating in conjunction with the other components of smart appliance 102-$m$, processor 303 executes software, processes data, and telecommunicates according to the operations described herein.

Memory 304 is non-transitory and non-volatile computer storage memory technology that is well known in the art (e.g., flash memory, etc.). Memory 304 is configured to store operating system 311, application software 312, and database 313. The operating system is a collection of software that manages, in well-known fashion, smart appliance 102-$m$'s hardware resources and provides common services for computer programs, such as those that constitute the application software. The application software that is executed by processor 303 according to an illustrative embodiment enables smart appliance 102-$m$ to perform the functions disclosed herein. Database 313 comprises information about each sensor component and about each actor component and information about smart appliance 102-$m$ in general.

It will be clear to those having ordinary skill in the art how to make and use alternative embodiments that comprise more than one memory 304; or comprise subdivided segments of memory 304; or comprise a plurality of memory technologies that collectively store the operating system, application software, and database.

HAN interface module 305 comprises a network adapter that is configured to enable smart appliance 102-$m$ to telecommunicate with other devices and systems, by receiving signals therefrom and/or transmitting signals thereto via radio receiver 321 and radio transmitter 322, respectively, via Bluetooth Low Energy (BLE) in accordance with an illustrative embodiment of the present invention. For example, network interface module 305 communicates with one or both of system controller 101 and mobile station 103. In some other embodiments of the present invention, HAN interface module 305 can communicate via one or more different types of wireless network technology standards, in addition to or instead of BLE, such as Z-Wave, ZigBee, Wi-Fi, Bluetooth Classic, or Thread, for example and without limitation. In a multiple protocol configuration, a first network adapter can support a first standard (e.g., BLE, etc.), a second network adapter can support a second standard (e.g., WiFi, etc.), and so on, for example and without limitation.

Module 305 is based on an LSR TiWi-uB1 BLE module according to an illustrative embodiment of the present invention. In some other embodiments of the present invention, module 305 can be based on another type of module. As those who are skilled in the art will appreciate after reading this specification, module 305 can comprise one or more of the elements that are depicted in FIG. 3 as being separate from module 305, such as processor 303 and/or memory 304.

In accordance with an illustrative embodiment, smart appliance 102-*m* uses HAN interface module 305 in order to telecommunicate wirelessly with external devices. It will be clear to those skilled in the art, however, after reading the present disclosure, how to make use and use various embodiments of the present invention in which smart appliance 102-*m* communicates via a different type of wireless network (e.g., personal area network, local area network, etc.), or via a wired protocol (e.g., X10, KNX, etc.) over physical media (e.g., cable, wire, etc.) with one or more external devices, either in addition to or instead of the wireless capability provided by module 305. In any event, it will be clear to those skilled in the art, after reading this specification, how to make and use HAN interface module 305.

Figure 4:
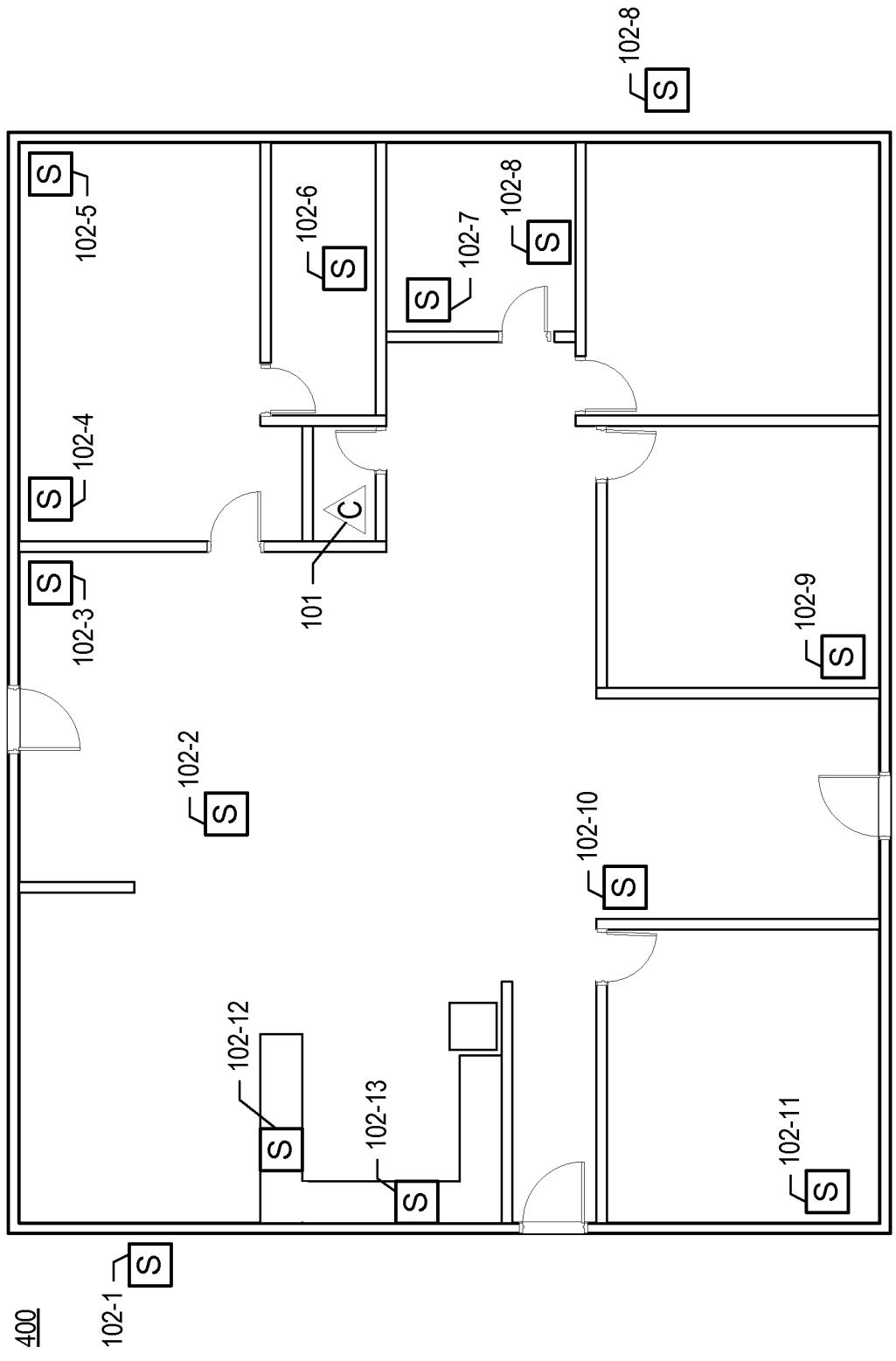
FIG. 4 depicts an illustrative floor plan of building environment 400.

FIG. 4 depicts an illustrative floor plan of building environment 400, which comprises a building and a surrounding environment of the building. Building environment 400 is equipped with system controller 101 and smart appliances 102-1 through 102-13. The environment surrounding the building might include a strip of land running adjacent to the building, a yard or other property within which the building is situated, a street, a municipal area, and so on—for example and without limitation.

As those who are skilled in the art will appreciate, after reading this specification, environment 400 can comprise different numbers of smart appliances and/or system controllers than those depicted. Furthermore, the building of environment 400 is depicted is a house, but as those who are skilled in the art will appreciate, after reading this specification, the building can be a different type of structure with a roof and walls, or can instead be a defined area that comprises multiple sub-areas, wherein at least a portion of the area and/or sub-areas is defined by something other than a roof and/or walls.

At least some of the rooms or areas within the building comprise one or more smart appliances. The smart appliances provide at least some of the functionality described earlier. As can be seen in FIG. 4, the smart appliances are situated throughout the building and the surrounding environment. At least some of the appliances are customarily moved, either while in use (e.g., a toothbrush being picked up and handled, etc.) or for use at an entirely different location within environment 400 (e.g., flashlight being taken outside at night, etc.).

As those who are skilled in the art will appreciate, after reading this specification, system controller 101 does not have to be physically present within the building. The functions performed by illustrative controller 101 can, in fact, be executed anywhere. For example and without limitation, the functions can be executed in "the Cloud," in which case the sensor and actor devices connect to the Cloud, either directly or via a home-to-cloud gateway. In other words, system controller 101 can be virtualized or located somewhere else other than within building environment 400.

Figure 5:
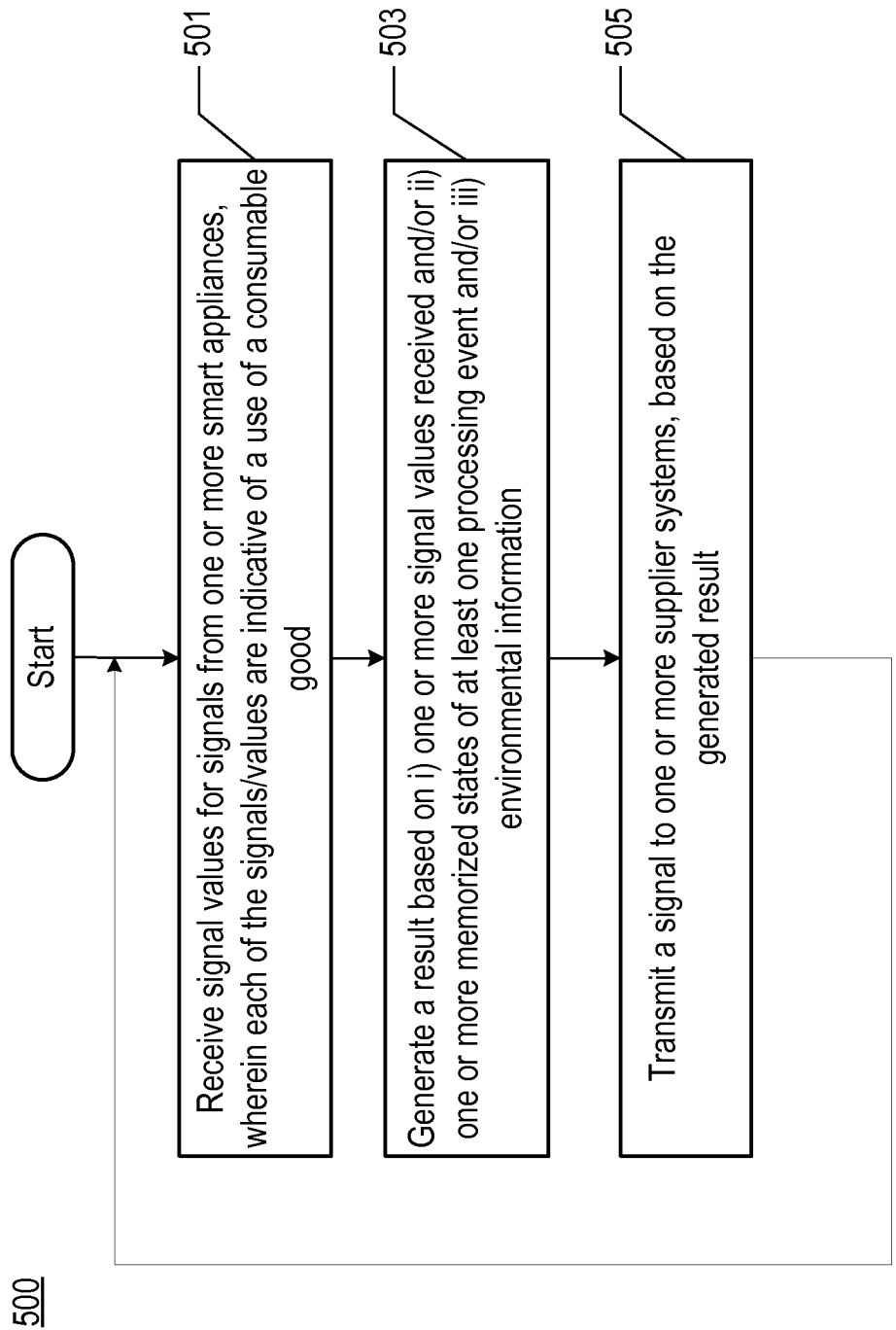
FIG. 5 depicts some salient operations of method 500 according to an illustrative embodiment of the present invention.

FIG. 5 depicts some salient operations of method 500 according to an illustrative embodiment of the present invention. System controller 101 is the entity within illustrative home automation system 200 that executes and coordinates the operations of method 500. For the pedagogical purposes, system controller 101 operates within building environment 400, as well as smart appliances 102-1 through 102-M. As those who are skilled in the art will appreciate however, after reading this specification, the operations described herein can be applied to a setting different than that of building environment 400.

In regard to method 500 and other methods disclosed herein, it will be clear to those having ordinary skill in the art, after reading the present disclosure, how to make and use alternative embodiments of the disclosed methods wherein the recited operations and sub-operations are differently sequenced, grouped, or sub-divided—all within the scope of the present invention. It will be further clear to those skilled in the art, after reading the present disclosure, how to make and use alternative embodiments of the disclosed methods wherein some of the recited operations and sub-operations are optional, are omitted, or are executed by other elements and/or systems.

At operation 501, system controller 101 receives signals having signal values, from one or more smart appliances 102-1 through 102-M. Operation 501 is described below and in FIG. 6. At least some of the signals or signal values are each indicative of a use of a consumable good.

At operation 503, system controller 101 generates one or more results based on i) the one or more signals received at operation 501 and/or ii) one or more memorized states of at least one processing event and/or iii) other information for providing context. Operation 503 is described below and in FIG. 7.

At operation 505, system controller 101 transmits one or more signals to one or more supplier systems 105-1 through 105-N, based at least in part on at least some of the results generated at operation 503. For example, the transmitted signal can convey a message comprising a supply reorder indication. Operation 505 is described below and in FIG. 8.

Figure 6:
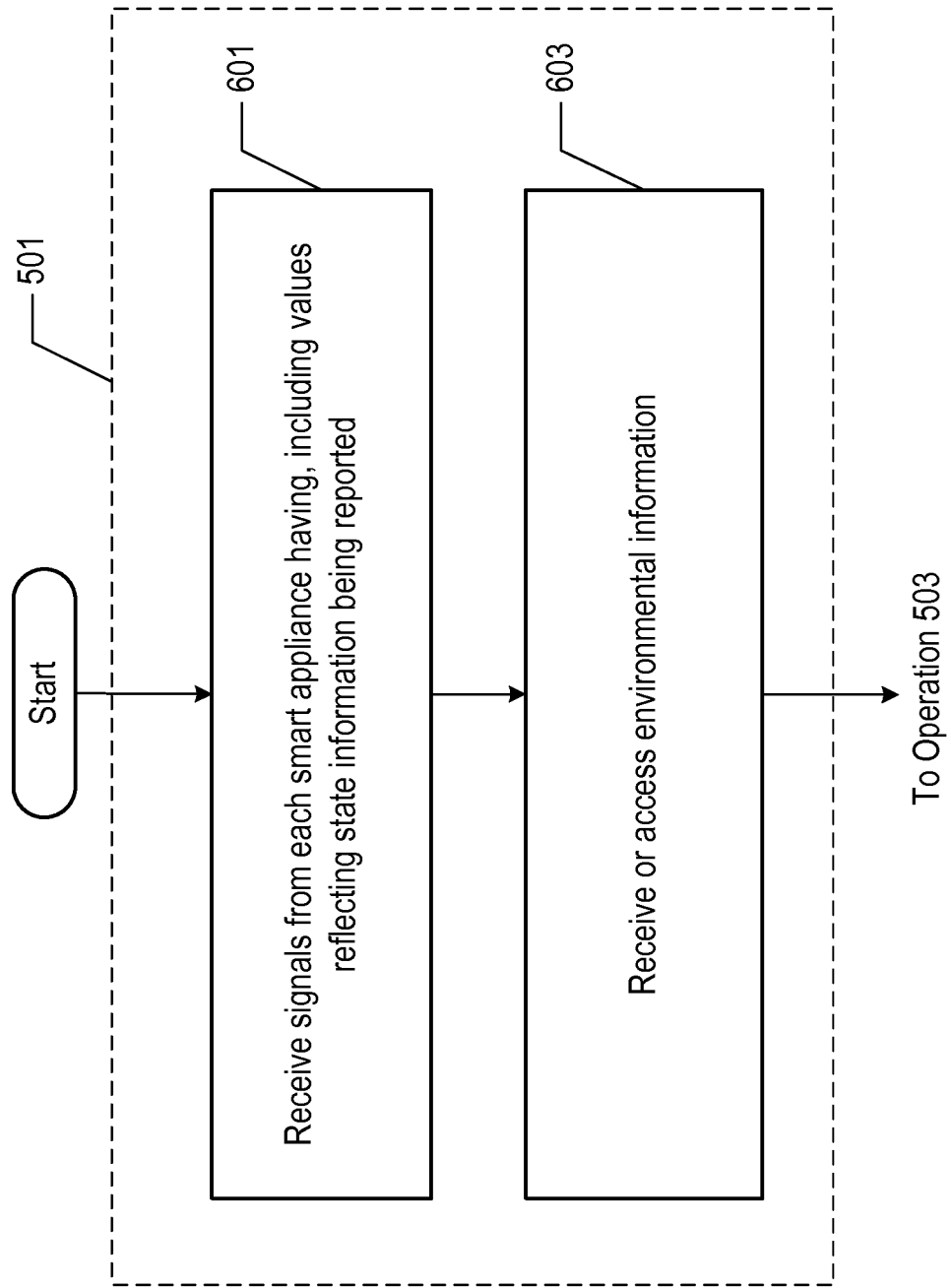
FIG. 6 depicts some salient sub-operations within operation 501.

FIG. 6 depicts some salient sub-operations within operation 501. At operation 601, controller 101 receives signals from each of smart appliances 102-1 through 102-M associated with building environment 400. In some embodiments of the present invention, controller 101 receives, from the sensor devices, the state or states being reported by each of the sensor devices (e.g., a consumable good has been used, a movement has been sensed, etc.) and conveyed by values of signals received by controller 101. Each signal value received from each sensor device is of plurality of possible signal values for that device. The plurality of signal values for a first sensor device and the plurality of signal values for a second sensor device can be independent of each other, dependent on each other, one dependent on the other, mutually exclusive, overlapping, identical, or of any other type of relationship.

At operation 603, system controller 101 receives or accesses other information for providing context, as described below and in FIG. 7.

Figure 7:
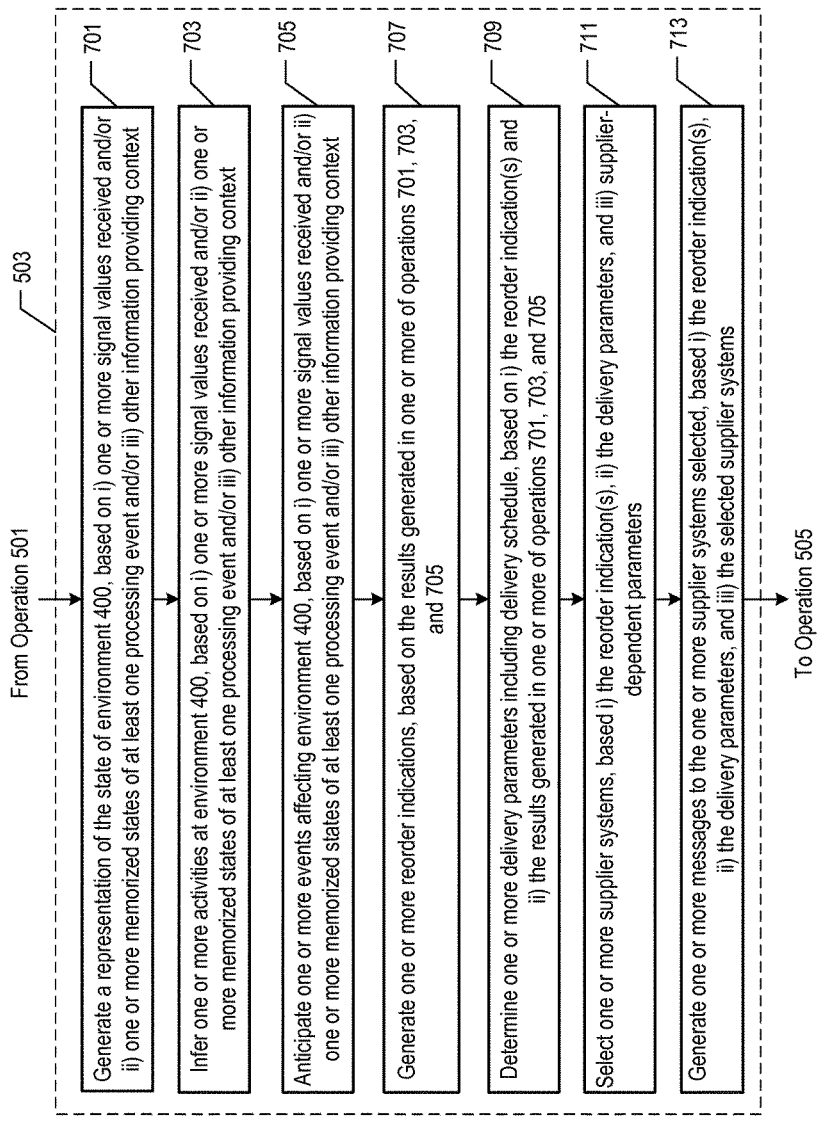
FIG. 7 depicts some salient sub-operations within operation 503.

FIG. 7 depicts some salient sub-operations within operation 503. As part of the operations of FIG. 7, system controller 101 generates one or more results based on one or more of the following, in any combination:
i. the one or more signal values received at operation 501.
ii. one or more memorized states of at least one processing event. The concept of a memorized state of a processing event was discussed above and in regard to processor 303 in FIG. 3.
iii. other information for providing context (e.g., schedules of availability, meteorological data, etc.).

At operation 701, using one or both of i) the values of the signals received from smart appliances 102-1 through 102-M and ii) the memorized states of one or more processing events, controller 101 generates a representation (e.g., a "map", etc.) of the state of building environment 400. The state of building environment 400 is characterized by anything that is directly detected (e.g., sensed, etc.) by smart appliances 102-1 through 102-M associated with the building environment, in combination with the memorized states of one or more processing events. The state of the building can be characterized by one or more detections made by each individual device, or by a combination of devices, or both, taking into account the memorized states of one or more processing events. The representation includes information such as or correlated with one or more of the following, for example and without limitation:
i. whether people are present in the building (e.g., sensors detecting motion within the past 30 minutes during the waking hours, infrared sensors detecting certain heat signatures during the nighttime hours, etc.), or present within a smaller area or areas of the building.
ii. whether pets are present in the building (e.g., microphones detecting a dog barking within the past 30 minutes, etc.).
iii. what is the location of people within the building (e.g., a sensor device worn by a person that reports its current location, etc.).
iv. which household systems are on (e.g., a system reports directly to the system controller, a sensor detecting the physical condition affected by a system, etc.).
v. which appliances are on (e.g., smart plug sensors detecting electrical current above a particular threshold, etc.).
vi. the location of people relative to the operating household systems and appliances (e.g., smart plug sensors detecting electrical current above a particular threshold and sensors detecting motion, etc.).
vii. the status of the electricity and/or fuel supply (e.g., natural gas, propane, heating oil, etc.) to the building.
viii. the temperatures inside and outside of the building.
ix. whether it is light or dark outside of the house.
x. an estimate of the amount of a consumable good having been used by a particular appliance since the previous resupplying of the consumable.

In some embodiments of the present invention, but not all, system controller 101 also uses other information for providing context to generate the representation of the state of building environment 400. Such information includes, without limitation, one or more of the following:
i. the geo-location of building environment 400 or of a room/area with the building.
ii. the current time of day and/or other calendrical time information.
iii. one or more weather conditions.
iv. the identities and/or number of people associated with the building (e.g., number of residents, number of guests, etc.), or associated with a smaller area or areas of the building (e.g., sleeping in a particular bedroom, etc.), or associated with a particular appliance (e.g., Alice's toothbrush, the adults' wine refrigerator, etc.).
v. the calendars of one or more residents/occupants of building environment 400, representative of their past, present, and/or future availabilities.
vi. the product costs of one or more consumable goods.
vii. the suppliers of one or more consumable goods.

Some or all of the foregoing information can be obtained ahead of time or when needed, as those who are skilled in the art will appreciate after reading this specification. Some or all of the information can be updated periodically or sporadically.

As part of generating the representation of the state of building environment 400, system controller 101 updates, in memory 202, the current state of at least one of the processing events. Each memorized state can be based on i) the receiving of signals from one or more smart appliances 102-1 through 102-M and/or ii) a previous state previously memorized in memory 202.

At operation 703, system controller 101 infers, or deduces, one or more activities or events at the building (i.e., inside and/or outside), based on one or more of i) the signals received from smart appliances 102-1 through 102-M, ii) one or more memorized states of at least one processing event, and iii) other information for providing context, in any combination thereof. The activities that can be inferred, as well as the sensor signals and/or states with which each activity is inferred, are as follows, for example and without limitation:
i. who is present. For example, John typically uses the garage door in the evening, and the motion sensor nearest the garage detects someone entering at 9 pm. Based on this information, with or without additional information, system controller 101 might infer that John is now present. As another example, a particular mobile station or other personal device that has been previously associated with John is detected (e.g., by detecting a MAC address of the device's WiFi and/or Bluetooth radio, etc.); from this, controller 101 might infer that John is present.
ii. who will be present in the future. For example, some privately shared information can be accessed (e.g., via the Internet), such as a) a pattern of movement of a particular vehicle through an Internet service such as Google Lattitude™ or Glympse™ (possibly tagged with the message "driving home with the kids") or b) even some more detailed information (e.g., the navigation computer in Jane's car has been set up to guide home and has calculated it will reach the home location in two hours). The information access can be in either "pull" (i.e., the controller 101 polls the info) or "push" (i.e., the computer in Jane's car notifies the home it is driving to). From this information, system controller 101 might infer that Jane will be home later.
iii. what people are doing. For example, the light sensor in the bathroom detects light, and water (or the flow of water) is detected in the bathtub. Based on this information, with or without additional information, system controller 101 might infer that someone is taking a bath.

iv. what people will be doing in the future. For example, it is sometime after 6 am on a workday and motion is detected in the master bedroom. Based on this information, with or without additional information, system controller 101 might infer that someone will be preparing to go to work.

v. which appliances will be used in the future. For example, it is sometime between 6 am and 8 am on a workday and motion is detected in the kitchen. Based on this information, with or without additional information, system controller 101 might infer that the coffee maker will be used.

vi. whether a system needs to be activated. For example, it is 7:30 am on a workday, the outside temperature is sensed as being −20° C., and motion is sensed as heading into the front hallway toward the door. Based on this information, with or without additional information, system controller 101 might infer that John's car should be remotely started.

The activity or activities inferred by system controller 101 can be human or non-human activities (i.e., activities in which a human does or does not participate in); the human activity can involve waking, eating, bathing, sleeping, and so on. In some situations, the inferring of the activity occurs independently of the current time of day and/or other environmental condition(s), while in other situations the inferring relies in part on knowing the time of day and/or other environmental condition(s) (e.g., for context purposes, etc.).

In accordance with an illustrative embodiment of the present invention, system controller 101 infers one or more activities as follows. First, controller 101 generates one or more predefined patterns of data that represent candidate activities. The predefined patterns (i.e., "candidate patterns") correspond to activities such as waking, eating, bathing, sleeping, and so on, without limitation. System controller 101 uses machine-learning techniques that are well known in the art to generate each candidate pattern. It will be clear to those having ordinary skill in the art, after reading the present disclosure, how to make and use alternative embodiments wherein other techniques generate the candidate patterns, or wherein a combination of machine learning and other techniques is used. The candidate patterns are generated when processing for system controller 101 is initialized, and they can be updated based in part on learning over time the patterns of one or more people living in, or otherwise occupying, building environment 400.

Second, controller 101 generates one or more occurring data patterns, based at least in part on the sensor signals received from the sensor devices and the memorized states of one or more processing events. The characteristics of the generated patterns can be based on various attributes surrounding the candidate activities being considered. The set of sensor data to be used in determining the one or more patterns can vary, in terms of time (e.g., the past 15 minutes, the last hour, etc.) and/or in terms of the sensor devices involved with respect to rooms (e.g., master bedroom and bathroom, the entire inside of the house, etc.) and/or in terms of the types of sensor devices involved (e.g., motion sensors only, motion sensors and light sensors, all sensors, etc.), for example and without limitation. Additional examples are provided below.

After the proper attributes, the set of sensor data to be used, and other relevant considerations are defined for a particular type of candidate activity or activities being considered, controller 101 uses machine-learning techniques that are well known in the art to generate each occurring data pattern. It will be clear to those having ordinary skill in the art, after reading the present disclosure, how to make and use alternative embodiments wherein other techniques generate the patterns, or wherein a combination of machine learning and other techniques is used.

Third, controller 101 measures how precisely each generated pattern of occurring data matches one or more of the predefined, candidate patterns. Controller 101 compares one pattern to another and evaluates a proper measure of preciseness between them, in well-known fashion.

Fourth, based on the preceding measures of preciseness, controller 101 determines a relationship, if any, as between each generated pattern and one or more activities and, as a result, infers one or more activities that are or are not occurring. For example, by considering the respective measures of preciseness between each generated pattern being evaluated and the candidate patterns that represent candidate activities, it might be inferred that a person in building environment 400 is, in all likelihood, i) preparing breakfast, while the same person is probably ii) reviewing a work presentation, but the same person is most likely iii) not doing the laundry (because it appears that a second person is).

As discussed above, the inferring can be based on various sensor data (e.g., current signal values received, etc.) in the context of internal memorized states of one or more processing events. In some situations, for example, the inferring relies on one or more motion-detection sensor devices, wherein the signals received from the sensor devices and relied upon convey whether motion is detected or not in the proximity of the sensor device. The activity that is inferred can be based on tracking the frequency at which each sensor device detects motion and comparing a corresponding, generated pattern to one or more candidate patterns characterized by the frequency-related attribute. Illustratively, when motion is sensed in quick succession in certain rooms of the house in mid-afternoon, the inferred activity might be that children are playing; on the other hand, when motion is sensed in slow succession in those rooms at 10:00 pm, the activity inferred might be that adults are walking around.

Within the scope of inferring, system controller 101 is capable of deriving one or more events, which might reflect internal or virtual states of the controller. For example, controller 101 is capable of inferring internally a "nighttime" event as occurring. The nighttime event triggers many system-wide actions such as turning off devices, setting up the HVAC system to night mode, and so on. The nighttime event is generated internally based on higher order digital filters being applied to multiple sensor devices, usually motion-sensor devices, in the following manner. Controller 101 observes the frequency/patterns of motion sensor detections. If the detections slowly decrease to zero between 9:00 pm and 1:00 am, controller 101 decides that the residents have gone to sleep and generates the nighttime virtual event to switch building environment 400 into the night mode.

A similar procedure is executed in the morning. Slowly waking up, a resident starts tripping a motion sensor in the sleeping room, then gets out of bed, and walks to a bathroom, tripping more and more motion sensors. If the motion activity reaches a predetermined threshold, system controller 101 infers a "daytime" event as occurring, and various systems within building environment 400 "wake up": a coffeemaker brews coffee, lights switch from a calm/night mood to a morning/energetic mood, a radio tunes to a radio station, and so on.

The activity that is inferred can also be based on which of multiple ranges of times currently applies (e.g., 5:00 am to 8:00 am [waking hours], 11:00 am to 1:00 pm [lunch hours], 6:00 pm to 9:00 pm [dinner hours], 10:00 pm to 1:00 am [retiring hours]). For example, if there is motion detected in the kitchen at 7:00 am, then the activity inferred might be breakfast preparation; on the other hand, if there is motion detected in the kitchen at 1:00 am, then someone might be getting a glass of water.

The activity that is inferred can also be based on tracking the relative times at which i) the first sensor device detects motion in a first area of the building and ii) the second sensor device detects motion in a second area of the building. For example, if there is motion detected first in the bedroom, then bathroom, then the kitchen, the activity inferred might be preparing for the day ahead; on the other hand, if there is motion detected first in the living area, then kitchen, the activity inferred might be getting a snack to bring back into the living area.

The activity inferred can be something other than an activity occurring at a sensed position and time by a motion sensor in the particular room or area. For example, motion sensor devices have been traditionally associated with burglar alarm systems, and they detect that a burglar is breaking into a particular room and at a particular time. In contrast, system controller 101 can use the signals from motion sensor devices in other "automation domains", such as turning on a coffee maker in the kitchen at 7:30 am when motion is detected in the bedroom at 7:00 am, because the inferred activity is workday preparation.

In some embodiments of the present invention, system controller 101 infers one or more activities at the building that are not occurring, based on a combination of the signals received from smart appliances 102-1 through 102-M. For example, it is sometime between 6:00 am and 8:00 am on a workday and motion is detected in the kitchen in a home with a single resident. Based on this information in the example, with or without additional information, system controller 101 might infer that the bedroom will not be occupied in the future and might take appropriate action (e.g., turn down the heat in the bedroom, etc.).

At operation 705, system controller 101 anticipates one or more events that affect building environment 400, based on one or more of i) the signals received from smart appliances 102-1 through 102-M, ii) one or more memorized states of at least one processing event, and iii) other information for providing context, in any combination thereof. System controller 101 uses the signals received from a sensor source (e.g., physical sensor device, virtual sensor, etc.), in which the signals convey a prediction (e.g., forecast, etc.) of a future condition that is relevant to building environment 400. Such a source can be, for example and without limitation, a weather-forecasting web service, and such a future condition can be, for example and without limitation, future temperature, future air quality, future cloud cover, future precipitation, and so on.

In a particular example, system controller 101 executes a thermostatic algorithm that runs a heating system control, which is influenced by the predicted temperature received from the web-based "sensor." This is particularly advantageous if there is a long lag in building environment 400's heating system, in which an event such as an extreme change in weather should be anticipated for optimal HVAC control. Anticipating a future outside temperature can reduce energy consumption by timing the heating in an optimal manner. Conversely, without anticipating such events, the heating system might not operate when needed and might operate when no longer needed, possibly resulting in undesirable oscillations. In some embodiments of the present invention, controller 101 controls the heating system based on the current outside temperature as monitored by a sensor device outside of building environment 400, instead of or in addition to basing the control on the future outside temperature.

As those who are skilled in the art will appreciate, after reading this specification, system controller 101 can use any predicted state (e.g., future temperature, future air quality, future cloud cover, future precipitation, etc.) that is received from one or more sensor devices or sources (virtual or otherwise), in order to anticipate one or more events and, accordingly, to affect one or more actor devices. Furthermore, controller 101 can use i) one or more such sources of predictions with ii) one or more sensor devices that provide state information of current conditions, in any combination.

As those who are skilled in the art will appreciate, after reading this specification, system controller 101 can anticipate something by inferring that it will happen, in at least some instances.

At operation 707, system controller 101 generates one or more reorder indications, based on one or more of i) the state-related results generated in accordance with operation 701, ii) the inference-related results generated in accordance with operation 703, and iii) the anticipation-related results generated in accordance with operation 705, in any combination thereof. A reorder indication indicates that, based on one or more of the results from operations 701, 703 and 705, a particular consumable good is to be reordered. However, the circumstances (e.g., when, to which system, with how many messages, etc.) of an actual reorder message being sent to a supplier system is determined in accordance with one or more of the following operations.

At operation 709, system controller 101 determines one or more delivery parameters, based on i) one or more reorder indications having been generated in accordance with operation 707, and ii) one or more of a) the state-related results generated in accordance with operation 701, b) the inference-related results generated in accordance with operation 703, and c) the anticipation-related results generated in accordance with operation 705, in any combination thereof. In some embodiments, one of the delivery parameters determined is the delivery schedule. In particular, the delivery time (i.e., time-of-day and/or date) can be determined. For example and without limitation, the determined delivery time can be based on an availability of one or more people, wherein the availability is actual, inferred, and/or anticipated by system controller 101. As another example, the determined delivery time can be based on the number of people associated with an environment within which one or more appliances are situated.

In particular, system controller 101 is capable of using one or more calendars in a variety of ways, in order to determine a delivery time. For pedagogical purposes, a calendar is used in this disclosure as a non-limiting example of a system of organizing time (e.g., days, etc.) for one or more purposes. As those who are skilled in the art will appreciate after reading this specification, a different system of organizing time can be used. System controller 101 is capable of accessing and using one or more calendars that reflect the schedules of one or more people who are associated with building environment 400. A person who is associated with building environment 400 can be, for example and without limitation, a resident, a homeowner, a parent or guardian, a child, an occupant, an inhabitant, a guest, or of another status. Controller 101 uses the calendars in order to determine when one or more people will be present at home, or when one or more people will be away from home, or both.

Furthermore, controller 101 can consider the status of each person associated with environment 400 in order to determine whether to base a delivery time more on one person's schedule (e.g., that of a parent, etc.) than on another person's schedule (e.g., that of a child, etc.). Controller 101 can also consider the number of people belonging to a particular status in order to determine, for example and without limitation, whether to base a delivery time more on multiple people who have lesser authority being available (e.g., four teenagers, etc.) than on one person who has greater authority being available (e.g., a parent, etc.). As those who are skilled in the art will appreciate after reading this specification, controller 101 can determine a delivery time or times of one or more consumable goods, based on one or more people's statuses as applied in a different way than described above.

Controller 101 can use the calendars to determine a delivery time either directly or indirectly. In determining a delivery time directly, controller 101 can determine a particular delivery time that coincides with when one or more people are scheduled, as reflected in the calendars, to be present at the home. Controller 101 can also refrain from determining a particular delivery time that coincides with when one or more people are scheduled to be away from the home.

In determining a delivery time indirectly, controller 101 can determine a particular delivery time by inferring or anticipating that a need for a consumable good will be greater at a particular time (or during a particular time period) than at another time, or will be less at a particular time than at another time. For example and without limitation, a need for a consumable good might be greater at a particular time because more people are scheduled to be present at that time than at other times (e.g., guests are staying overnight for the next New Year's Eve celebration, all family members are usually home on Sunday evenings, etc.). On the other hand, a need for a consumable good might be less at a particular time because fewer people are scheduled to be present at that time that at other times (e.g., family members are going away for two weeks in July, no one is usually home on Wednesday evenings, etc.). As those who are skilled in the art will appreciate after reading this specification, controller 101 can determine a delivery time or times of one or more consumable goods, based on an actual, inferred, and/or anticipated need as applied or determined in a different way than described above.

At operation 711, system controller 101 selects one or more supplier systems 105-1 through 105-N, based on i) one or more reorder indications having been generated in accordance with operation 707, and ii) one or more delivery parameters determined in accordance with operation 709, and iii) any supplier-dependent parameters (e.g., availability, cost, etc.). For example and without limitation, the supplier selected can be based on an availability of the supplier depending on the delivery time determined. As another example, the supplier selected can be based on the shipping fee that one or more suppliers charge. Notably, a first supplier might have been selected initially, until system controller 101 determines that it is presently advantageous to utilize a second supplier over the first, for one or more reasons (e.g., better shipping rates with the second supplier, etc.).

At operation 713, system controller 101 generates one or more reorder messages to be sent to the one or more supplier systems, based on i) one or more reorder indications having been generated in accordance with operation 707, and ii) one or more delivery parameters determined in accordance with operation 709, and iii) one or more supplier systems having been selected in accordance with operation 711. For example and without limitation, reorders corresponding to multiple reorder indications can be aggregated into fewer messages sent to the supplier systems. This aggregating into few messages can be based on, for example and without limitation, different consumable goods to be reordered from the same supplier, multiple reorder indications having been generated for the same consumable good since a previous reorder was sent to a supplier, and so on.

In some embodiments of the present invention, one or more of the following can be based on a characteristic of one or more memorized states in relation to one or more predetermined criteria, in any combination:

i. one or more of the reorder indications generated at operation 707.

ii. one or more of the delivery parameters determined at operation 709.

iii. one or more of the supplier systems selected at operation 711.

iv. one or more of the reorder messages generated at operation 713.

For example and without limitation, a reorder indication might be generated for soap (i.e., the consumable) in a dispenser (i.e., the appliance) if a current state of the dispenser, as based on signals received and when correlated with the amount of soap already used, exceeds a predetermined value. Alternatively, the reorder indication might be generated when the amount of soap remaining in the dispenser is below a threshold, wherein the amount remaining can be estimated based in part on the current state of the dispenser as based on signals received from the dispenser.

As those who are skilled in the art will appreciate after reading this specification, one or more of the operations described above can be repeated prior to an actual transmitting of a reorder to a supplier system, in an iterative process for optimizing the overall reordering process of one or more consumable goods.

Figure 8:
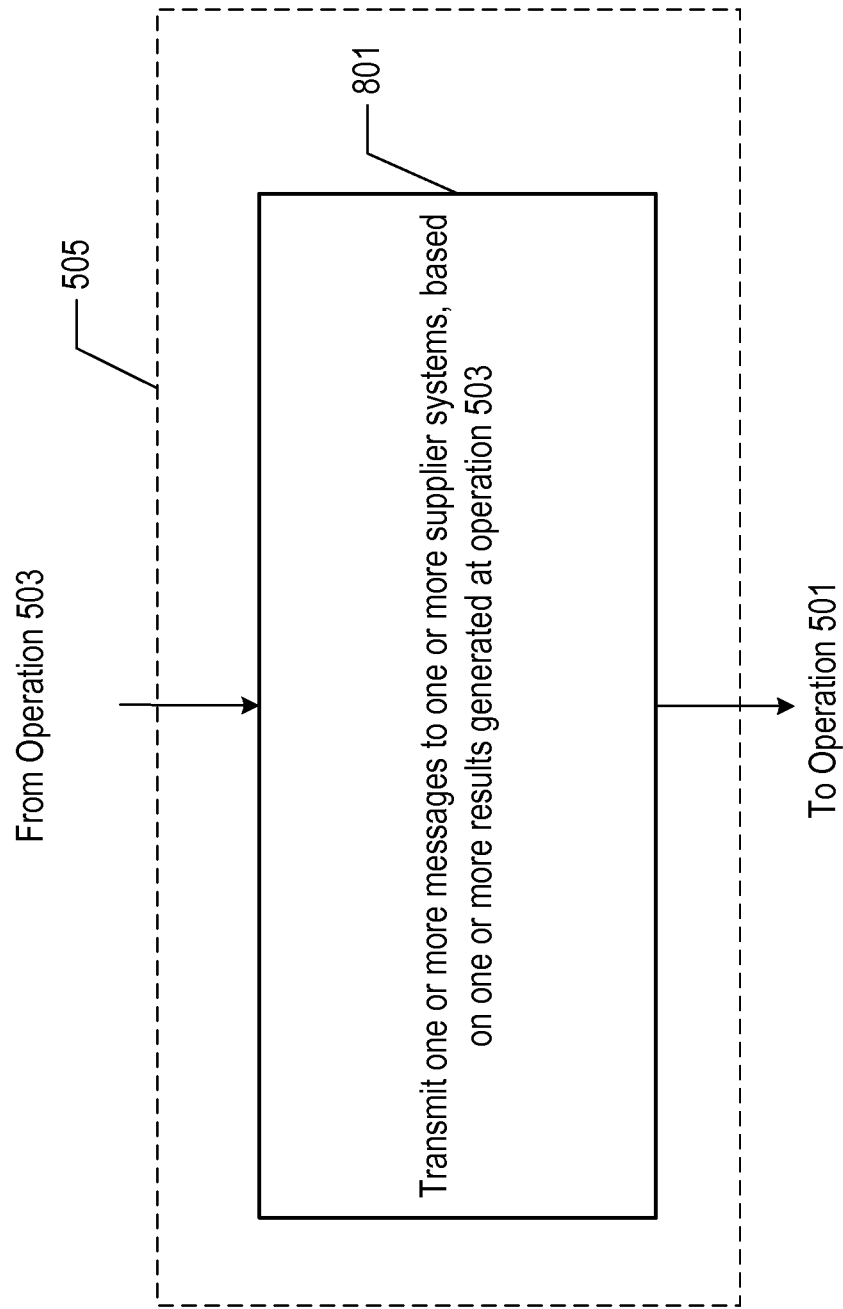
FIG. 8 depicts some salient sub-operations within operation 505.

FIG. 8 depicts some salient sub-operations within operation 505. At operation 801, system controller 101 transmits one or more reorder messages, or signals that are based on the one or more messages, to one or more of supplier systems 105-1 through 105-N, based on one or more of the reorder messages generated in accordance with operation 503.

At operation 801, control of execution returns to operation 501.

In some embodiments of the present invention, an independent, physical reorder button that is equipped with a radio module (e.g., a BLE-based module, etc.) can constitute a smart device **102-*m*, in which the radio module is programmed in accordance with at least some of the techniques disclosed herein. Each such "smart" button has a unique identifier that can be mapped to a reorder template. Depending on the usage scenario, the association of identifier-to-template can be performed by a home resident (or other consumer) or preconfigured by a supplier (e.g., a bottled water supplier, etc.). When a consumer presses the button to reorder the consumable, the radio module of the smart button sends a notification of the button-push action to system controller 101. In turn, system controller 101** contacts the supplier via the Internet, executing the reorder transaction. The reorder button so described is universal in its function, meaning that it can be used in conjunction with a variety of appliances and their consumables. For example, before fully automated dispensers and other smart appliances become widely available, each reorder pushbutton can be situated nearby and associated with a consumable-using device, or group of devices.

In some embodiments in which the reorder button is used, system controller 101 autonomously completes the reorder transaction and optionally notifies the button of the transaction status, expected delivery, and so on. If the button is equipped with a display (e.g., graphic display, text display, LED indicator, etc.), the display can show the status of the expected delivery (e.g., reordered on <<date/time>>, delivery expected on <<date/time>>, etc.). Optionally, system controller 101 might re-route the message it receives from the button, aggregate the reorder transaction with other reorder indications related to other smart appliances, decide on scheduling based on the residents' calendars, and so on.

It is to be understood that the disclosure teaches just one set of examples of the illustrative embodiment and that many variations of the invention can easily be devised by those skilled in the art after reading this disclosure and that the scope of the present invention is to be determined by the following claims.

What is claimed is:

1. A method comprising:
    receiving, by a first computer system, a first signal from a first appliance, wherein the first signal is indicative of a single use of a particular fast-moving consumer good (FMCG) by the first appliance;
    updating in a memory, by the first computer system, a current memorized state of at least one processing event, the current memorized state being based on i) the first signal and ii) a previous memorized state, such that the previous memorized state comprises an estimate of an amount of the FMCG that has already been used since a previous resupplying of the FMCG;
    generating, by the first computer system, a first indication that the FMCG is to be resupplied, based on the current memorized state;
    transmitting, by the first computer system, a resupply message to a second computer system, wherein the transmitted resupply message is based on the generated first indication, and wherein the second computer system resupplies the FMCG based on receiving the transmitted resupply message; and
    determining a time to deliver the FMCG based on anticipating a need for the FMCG during a first period of time in an environment in which the first appliance is situated, wherein the need is anticipated based on the number of people expected to be present within the environment during both the first period of time and a second period of time.

2. The method of claim 1 wherein the current memorized state of the at least one processing event is based on a predetermined sequence of past signals having been received by the first computer system prior to the receiving of the first signal, wherein the past signals are indicative of usage of the particular FMCG.

3. The method of claim 1 wherein the current memorized state of the at least one processing event is based on a past signal having been received by the first computer system within a predetermined time interval prior to the receiving of the first signal, wherein the past signal is indicative of usage of the particular FMCG.

4. The method of claim 1, further comprising:
    receiving, by the first computer system, a second signal from a second appliance; and
    generating, by the first computer system, a second indication that the FMCG is to be resupplied, based on the current memorized state, wherein the current memorized state is also based on the receiving of the second signal from the second appliance;
    wherein the transmitted resupply message is also based on the generated second indication, whereby the first and second indications are aggregated into the resupply message.

5. The method of claim 1, wherein the resupply message comprises the delivery time determined.

6. The method of claim 5, wherein the delivery time determined is based on an availability of a person.

7. The method of claim 1, further comprising selecting a second computer system to which the resupply message is to be transmitted, based on the current memorized state.

8. The method of claim 7, wherein the selecting of the second computer system is based on a cost of the FMCG.

9. A building automation controller comprising:
    a first network adapter configured to receive a first signal from a first appliance, wherein the first signal is indicative of a single use of a particular fast-moving consumer good (FMCG) by the first appliance;
    a processor configured to:
        a) update, in a memory, a current memorized state of at least one processing event, the current memorized state being based on i) the first signal and ii) a previous memorized state, such that the previous memorized state comprises an estimate of an amount of the FMCG that has already been used since a previous resupplying of the FMCG,
        b) generate a first indication that the FMCG is to be resupplied, based on the current memorized state; and
        c) determine a time to deliver the FMCG based on anticipating a need for the FMCG during a first period of time in an environment in which the first appliance is situated, wherein the need is anticipated based on the number of people expected to be present within the environment during both the first period of time and a second period of time; and
    a second network adapter configured to transmit a resupply message to a computer system, wherein the transmitted resupply message is based on the generated first indication, and wherein the computer system resupplies the FMCG based on receiving the transmitted resupply message.

10. The controller of claim 9 wherein the current memorized state of the at least one processing event is based on a predetermined sequence of past signals having been received by the first network adapter prior to the receiving of the first signal, wherein the past signals are indicative of usage of the particular FMCG.

11. The controller of claim 9 wherein the current memorized state of the at least one processing event is based on a past signal having been received by the first network adapter within a predetermined time interval prior to the receiving of the first signal, wherein the past signal is indicative of usage of the particular FMCG.

12. The controller of claim 9, wherein the first network adapter is further configured to receive a second signal from a second appliance;
    wherein the processor is further configured to generate a second indication that the FMCG is to be resupplied, based on the current memorized state, wherein the current memorized state is also based on the receiving of the second signal from the second appliance; and wherein the transmitted resupply message is also based on the generated second indication, whereby the first and second indications are aggregated into the resupply message.

13. The controller of claim 9, wherein the resupply message comprises the delivery time determined.

14. The controller of claim 9, wherein the processor is further configured to select the computer system to which the resupply message is to be transmitted, based on the current memorized state.

15. A building automation system comprising:
a first appliance comprising:
  1) a sensor configured to sense a single use of a particular fast-moving consumer good (FMCG) and
  2) a first network adapter configured to transmit a first signal, wherein the first signal is indicative of the single use of the FMCG having been sensed by the sensor; and
a controller comprising:
  1) a second network adapter configured to receive the first signal from the first appliance,
  2) a processor configured to:
    a) update, in a memory, a current memorized state of at least one processing event, the current memorized state being based on i) the first signal and ii) a previous memorized state, such that the previous memorized state comprises an estimate of an amount of the FMCG that has already been used since a previous resupplying of the FMCG,
    b) generate a first indication that the FMCG is to be resupplied, based on the current memorized state, and
    c) determine a time to deliver the FMCG based on anticipating a need for the FMCG during a first period of time in an environment in which the first appliance is situated, wherein the need is anticipated based on the number of people expected to be present within the environment during both the first period of time and a second period of time; and
  3) a third network adapter that is configured to transmit a resupply message to a computer system, wherein the transmitted resupply message is based on the generated first indication, and wherein the computer system resupplies the FMCG based on receiving the transmitted resupply message.

16. The system of claim 15 wherein the current memorized state of the at least one processing event is based on a predetermined sequence of past signals having been received by the second network adapter prior to the receiving of the first signal, wherein the past signals are indicative of usage of the particular FMCG.

17. The system of claim 15 wherein the current memorized state of the at least one processing event is based on a past signal having been received by the second network adapter within a predetermined time interval prior to the receiving of the first signal, wherein the past signal is indicative of usage of the particular FMCG.

18. The system of claim 15, further comprising:
a second appliance comprising a fourth network adapter that is configured to transmit a second signal;
wherein the second network adapter is further configured to receive the second signal from the second appliance;
wherein the processor is further configured to generate a second indication that the FMCG is to be resupplied, based on the current memorized state, wherein the current memorized state is also based on the receiving of the second signal from the second appliance; and
wherein the transmitted resupply message is also based on the generated second indication, whereby the first and second indications are aggregated into the resupply message.

19. The system of claim 15, wherein the resupply message comprises the delivery time determined.

20. The system of claim 15, wherein the processor is further configured to select the computer system to which the resupply message is to be transmitted, based on the current memorized state.

* * * * *